(12) United States Patent
Korenaga et al.

(10) Patent No.: US 7,864,427 B2
(45) Date of Patent: Jan. 4, 2011

(54) DIFFRACTIVE OPTICAL ELEMENT AND METHOD FOR MANUFACTURING THE SAME, AND IMAGING APPARATUS USING THE DIFFRACTIVE OPTICAL ELEMENT

(75) Inventors: Tsuguhiro Korenaga, Osaka (JP); Masa-aki Suzuki, Osaka (JP)

(73) Assignee: Panasonic Corporation, Osaka (JP)

( * ) Notice: Subject to any disclaimer, the term of this patent is extended or adjusted under 35 U.S.C. 154(b) by 412 days.

(21) Appl. No.: 11/996,116

(22) PCT Filed: Aug. 24, 2006

(86) PCT No.: PCT/JP2006/316594
§ 371 (c)(1), (2), (4) Date: Jan. 18, 2008

(87) PCT Pub. No.: WO2007/026597
PCT Pub. Date: Mar. 8, 2007

(65) Prior Publication Data
US 2010/0134888 A1  Jun. 3, 2010

(30) Foreign Application Priority Data
Aug. 29, 2005  (JP) .................... 2005-247104

(51) Int. Cl.
*G02B 5/18* (2006.01)
(52) U.S. Cl. ..................... 359/576; 264/1.31
(58) Field of Classification Search ........... 359/569, 359/576, 742; 264/1.31, 1.32
See application file for complete search history.

(56) References Cited

U.S. PATENT DOCUMENTS

| | | | |
|---|---|---|---|
| 5,716,679 A | 2/1998 | Krug et al. | |
| 5,820,957 A * | 10/1998 | Schroeder et al. | 428/40.1 |
| 5,847,877 A | 12/1998 | Imamura et al. | |
| 6,759,471 B1 | 7/2004 | Ukuda | |
| 2003/0231403 A1 | 12/2003 | Shiga et al. | |
| 2004/0042102 A1* | 3/2004 | Ukuda | 359/883 |
| 2004/0125452 A1 | 7/2004 | Cho et al. | |
| 2004/0207781 A1 | 10/2004 | Yoshida | |
| 2005/0226122 A1 | 10/2005 | Ooi et al. | |
| 2005/0243423 A1 | 11/2005 | Nakai et al. | |
| 2006/0171031 A1 | 8/2006 | Suzuki | |

FOREIGN PATENT DOCUMENTS

| | | |
|---|---|---|
| CN | 1514266 | 7/2004 |
| JP | 3-191319 | 8/1991 |

(Continued)

*Primary Examiner*—Alessandro Amari
(74) *Attorney, Agent, or Firm*—Hamre, Schumann, Mueller & Larson, P.C.

(57) ABSTRACT

A diffractive optical element that can be molded readily, an imaging apparatus incorporating the diffractive optical element, and a method for manufacturing the diffractive optical element are provided. A diffractive optical element (10) includes a substrate (11) that is made of a first material containing a resin and has a surface (11a, 11b) on which a diffraction grating pattern (12a, 12b) is formed, and a coating film (13a, 13b) that is made of a second material containing a resin and is disposed so as to be in contact with a portion of the diffraction grating pattern (12a, 12b), and at least one material selected from the first material and the second material is a composite material containing inorganic particles.

19 Claims, 10 Drawing Sheets

FOREIGN PATENT DOCUMENTS

| | | |
|---|---|---|
| JP | 9-127321 | 5/1997 |
| JP | 10-268116 | 10/1998 |
| JP | 11-287904 | 10/1999 |
| JP | 2001-201625 | 7/2001 |
| JP | 2001-235608 | 8/2001 |
| JP | 2001-249208 | 9/2001 |
| JP | 2001-281429 | 10/2001 |
| JP | 2004-20912 | 1/2004 |
| JP | 2005-3772 | 1/2005 |
| JP | 2005-107298 | 4/2005 |

* cited by examiner

DIFFRACTIVE OPTICAL ELEMENT AND METHOD FOR MANUFACTURING THE SAME, AND IMAGING APPARATUS USING THE DIFFRACTIVE OPTICAL ELEMENT

TECHNICAL FIELD

The present invention relates to a diffractive optical element and a method for manufacturing the same, and an image apparatus using the diffractive optical element.

BACKGROUND ART

It has been known widely since before that a diffractive optical element having diffraction grating rings on its surface (e.g. aspherical lens) is capable of reducing lens aberrations such as field curvature and chromatic aberration (deviation of an image-formation point depending on wavelength). If the diffractive optical element is in a diffraction grating form having a cross section in a blazed form or a fine-step-like form inscribed in a blaze, the diffractive optical element is allowed to have a diffraction efficiency in a specific order of approximately 100% with respect to a single-wavelength light.

Theoretically, a depth d of a groove of a diffraction grating pattern (diffraction grating depth) such that a diffraction efficiency for a first-order diffracted light (hereinafter referred to as "first-order diffraction efficiency") with respect to a certain wavelength is 100% is given as Formula 1 below:

$$d = \frac{\lambda}{n(\lambda) - 1} \quad \text{[Formula 1]}$$

where $\lambda$ represents a wavelength, and $n(\lambda)$ represents a refractive index and is a function of wavelength.

According to Formula 1, the value of d that gives a diffraction efficiency of 100% varies as the wavelength $\lambda$ varies.

A diffractive optical element 100 shown in FIG. 12 is an exemplary conventional diffractive optical element. A substrate 101 is made of a material having a refractive index of $n(\lambda)$, and a blaze-like diffraction grating pattern 102 is formed on a surface of the substrate 101.

FIG. 13 is a graph showing the wavelength-dependent variation of the first-order diffraction efficiency of the diffractive optical element 100 having a diffraction grating depth d of 0.95 μm, in which the substrate 101 is made of a cycloolefin-based resin ("ZEONEX", produced by Zeon Corporation).

The first-order diffraction efficiency is approximately 100% with respect to a wavelength of 500 nm, whereas it is about 75% with respect to wavelengths of 400 nm and 700 nm. Thus, the variation of the diffraction efficiency with wavelength (wavelength dependence) is remarkable. When this diffractive optical element is applied to a lens used for imaging in a wide wavelength band (e.g. a visible light wavelength range of about 400 nm to 700 nm), unnecessary diffracted light is generated, which causes flare or ghost, thereby deteriorating images or degrading MTF (modulation transfer function) properties. Particularly when diffraction grating patterns are formed on both surfaces of a single lens or multiple surfaces in an optical system, the generation of unnecessary diffracted light becomes more remarkable.

A diffractive optical element 110 shown in FIG. 14 is another exemplary conventional diffractive optical element. An optical material having a refractive index and a refractive index dispersion different from those of a substrate 111 is coated over or cemented on a surface of the substrate 111 on which a diffraction grating pattern 112 is formed, whereby a coating film 113 of the optical material is formed. By so doing, the generation of unnecessary diffracted light can be suppressed. This diffractive optical element is disclosed more specifically in the documents shown below.

The Patent Document 1 discloses an example in which the wavelength dependence of the diffraction efficiency is reduced by setting a refractive index of a substrate on which a diffraction grating pattern is formed, and a refractive index of a coating film formed to cover the diffraction grating pattern, to specific conditions. The Patent Document 2 discloses an example in which the wavelength dependence of the MTF properties is reduced under the same refractive index conditions as those disclosed in the Patent Document 1.

The Patent Document 3 discloses an exemplary case in which the wavelength dependence of the diffraction efficiency is reduced by using a material obtained by combining a resin, glass, etc. satisfying certain refractive index conditions as materials for a substrate and a coating film.

The Patent Document 4 discloses that by using an energy-cured resin containing a fluorene derivative, an identical effect can be achieved.

Materials used in the diffractive optical element 110 are classified roughly into resins and glass. Further, refractive index conditions of members of the diffractive optical element 110 are identical to one another basically. Here, in the case where an optical material as a coating film 113 is coated over or cemented onto the substrate 111 on which the diffraction grating pattern 112 is formed, a diffraction grating depth d' that gives a first-order diffraction efficiency of 100% is given as Formula 2 shown below:

$$d' = \frac{\lambda}{|n1(\lambda) - n2(\lambda)|} \quad \text{[Formula 2]}$$

where $n1(\lambda)$ represents a refractive index of a material for forming the substrate, $n2(\lambda)$ is a refractive index of a material for forming the coating film, and both of $n1(\lambda)$ and $n2(\lambda)$ are functions of wavelength.

If the value of the right-hand side of Formula 2 becomes constant in a certain wavelength band, this means that there is no wavelength dependence of the diffraction efficiency in the foregoing wavelength band. In order to satisfy this condition and decrease the diffraction grating depth d', an increase in the value of $|n1(\lambda)-n2(\lambda)|$ is desired; that is, it is desired to form the substrate and the coating film with a combination of a material having a high refractive index and low dispersion and a material having a low refractive index and high dispersion. With this configuration, the diffraction grating depth d' is made greater than the diffraction grating depth d of Formula 1.

Meanwhile, some methods have been proposed as methods for manufacturing these diffractive optical elements. For example, the Patent Document 5 and the Patent Document 6 disclose manufacturing methods in which in order to remove bubbles that become a cause of unnecessary diffracted light, an optical material for coating is limited to one having a low viscosity, or vibration is applied after coating.

Patent Document 1: JP 9(1997)-127321 A
Patent Document 2: JP 3(1991)-191319 A
Patent Document 3: JP 10(1998)-268116 A
Patent Document 4: JP 11(1999)-287904 A
Patent Document 5: JP 2001-249208 A
Patent Document 6: JP 2001-235608 A However, the diffractive optical element shown in FIG. 12 has a drawback in that because of the wavelength dependence of the diffraction efficiency, unnecessary diffracted light is generated in a certain wide wavelength band. Further, the diffractive optical element shown in FIG. 14 is capable of reducing the wavelength dependence of the diffraction efficiency and suppressing the generation of unnecessary diffracted light, but has the following drawbacks: if glass is used as a material for the diffractive optical element, the molding is difficult, whereas if a resin is used, the diffraction efficiency and the wavelength dependence of the same become easily influenced by temperature variation; and the diffraction grating depth has to be increased since the materials are limited. If the diffraction grating depth is increased, there is a possibility that the molding would become difficult.

DISCLOSURE OF INVENTION

The present invention provides a diffractive optical element that can be molded readily, an imaging apparatus that incorporates the diffractive optical element, and a method for manufacturing the diffractive optical element.

A diffractive optical element of the present invention is a diffractive optical element that includes: a substrate made of a first material containing a resin, the substrate having a surface formed into a diffraction grating pattern; and a coating film made of a second material containing a resin, the coating film being disposed so as to be in contact with a portion of the diffraction grating pattern of the surface, wherein at least one material selected from the first material and the second material is a composite material containing inorganic particles.

An imaging apparatus of the present invention is an imaging apparatus that includes: an optical system; an imaging element for receiving light from a subject, the light having passed through the optical system; and an arithmetic circuit for generating a subject image based on information detected by the imaging element, wherein the optical system includes the above-described diffractive optical element of the present invention.

A method for manufacturing a diffractive optical element of the present invention is a method for manufacturing a diffractive optical element that includes: a substrate made of a first material containing a resin, the substrate having a surface formed into a diffraction grating pattern; and a coating film made of a second material containing a resin, the coating film covering the diffraction grating pattern, and the method includes the steps of: forming the substrate having the surface formed into the diffraction grating pattern; and forming the coating film so that the coating film covers the diffraction grating pattern, wherein at least one material selected from the first material and the second material is a composite material containing inorganic particles.

DESCRIPTION OF THE INVENTION

Figure 1:
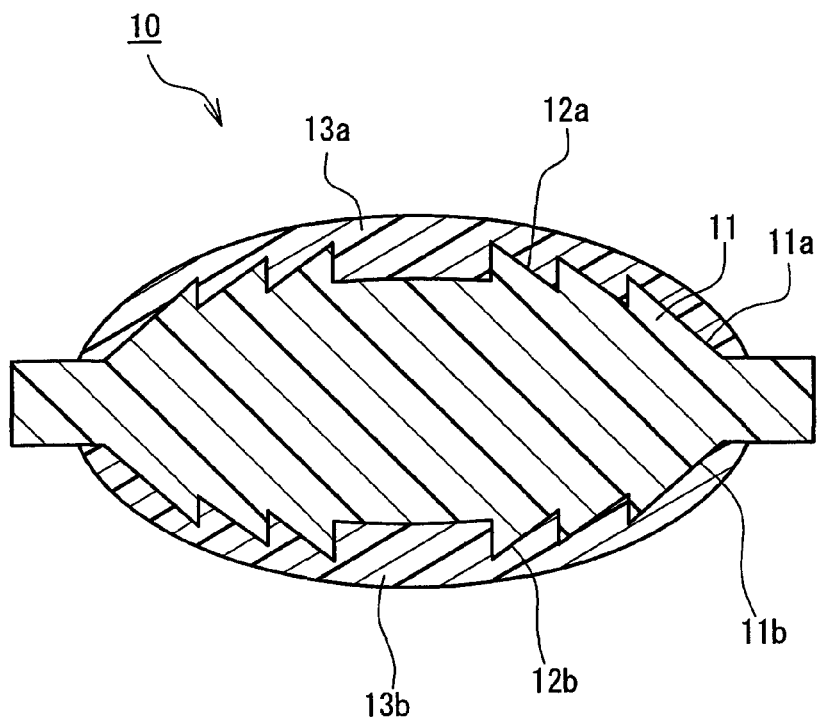
FIG. 1 is a sectional view showing a diffractive optical element according to Embodiment 1 of the present invention.

A diffractive optical element of the present invention includes a substrate having a surface formed into a diffraction grating pattern, and a coating film that covers the diffraction grating pattern. The foregoing substrate is made of a first material containing a resin, and the coating film is made of a second material containing a resin. At least one material selected from the first material and the second material is a composite material containing inorganic particles. With this configuration, the moldability is improved, as compared with the conventional case in which glass or the like is used. Further, the resin and the inorganic particles used in the foregoing materials, respectively, can be selected appropriately so that a difference between refractive indices of the coating film and the substrate is optimized. This widens the range of selection of materials, as compared with the conventional case where a resin or the like is used, thereby reducing the diffraction grating depth, for example. Therefore, the processing is made easier.

The inorganic particles preferably are made of at least one selected from zirconium oxide, zinc oxide, and aluminum oxide, since this makes it possible further to reduce the wavelength dependence of the diffraction efficiency in the diffractive optical element of the present invention.

The first material preferably is the above-mentioned composite material. In this case, the content by volume of the inorganic particles in the composite material preferably is in a range of not less than 5 percent by volume (vol %) and not more than 50 vol %. This is because higher moldability can be achieved, and it is possible to design a diffractive optical element having a relatively smaller diffraction grating depth and a smaller wavelength dependence of the diffraction efficiency.

The first material preferably is either a material having a higher refractive index and a higher Abbe's number than those of the second material, or a material having a lower refractive index and a lower Abbe's number than those of the second material. This is because by using such a first material, the wavelength dependence of the diffraction efficiency can be reduced. In the case where a difference between a d-line refractive index of the first material and that of the second material is in a range of not less than 0.03 and not more than 0.13, and a difference between Abbe's numbers of these is in a range of not less than 8, the wavelength dependence of the diffraction efficiency can be reduced further.

At least one material selected from the first material and the second material preferably is a material that absorbs light having a wavelength in the infrared radiation range, or a material that absorbs light having a wavelength in the ultraviolet radiation range, since this makes it unnecessary to provide a separate member having an infrared blocking effect or an ultraviolet blocking effect.

The depth of grooves of the diffraction grating pattern preferably is not more than 20 μm. If the depth of the grooves is not more than 20 μm, intervals of pitches of the diffraction grating pattern can be made smaller. This makes it possible to increase the number of pitches. As a result, for example, in the case where the diffractive optical element of the present invention is applied to a lens, it is possible to achieve the improvement of the performance of the optical element, such as the improvement of the MTF properties and the reduction of color aberration.

The diffractive optical element of the present invention preferably further includes an antireflection film that is disposed on a surface of the coating film on a side opposite to the diffraction grating pattern side, and that is made of a third material. This is because the antireflection film reduces light subjected to total reflection among the light entering the diffractive optical element, thereby further increasing the diffraction efficiency. The antireflection film may be a single-layer film, or a film composed of a plurality of layers. The third material preferably is a material having a lower refractive index than that of the second material, since this makes it possible to reduce the reflected light further. The third material more preferably is a material containing a resin and inorganic particles (particularly silicon oxide), since this makes it possible to reduce the wavelength dependence of the diffraction efficiency further.

The average particle diameter of the inorganic particles contained in at least one selected from the first material, the second material, and the third material preferably is in a range of not less than 1 nm and not more than 100 nm. This is because in the case where the particle diameters of the inorganic particles are in a range of not less than 1 nm and not more than 100 nm, only Rayleigh scattering occurs, and the composite material has improved dispersion properties, thereby becoming a material having higher transparency.

An imaging apparatus of the present invention includes an optical system; an imaging element for receiving light from a subject, which has passed through the optical system; and an arithmetic circuit for generating a subject image based on information detected by the imaging element, wherein the optical system includes the aforementioned diffractive optical element. Since the image apparatus of the present invention includes the diffractive optical element of the present invention having excellent moldability in the optical system, the reduction of manufacturing costs is enabled.

A method for manufacturing a diffractive optical element according to the present invention is a method for manufacturing a diffractive optical element that includes a substrate that is made of a first material containing a resin and has a surface formed into a diffraction grating pattern, and a coating film that is made of a second material containing a resin and covers the diffraction grating pattern, and the method includes the steps of forming the substrate having the surface formed into the diffraction grating pattern; and forming the coating film so that the coating film covers the diffraction grating pattern. In the method, at least one material selected from the first material and the second material is a composite material containing a resin and inorganic particles. With the manufacturing method including such steps, a diffractive optical element with excellent moldability can be provided.

Further, the step for forming the coating film preferably includes a substep of placing a material containing a resin in a non-cured state so as to cover the diffraction grating pattern in an atmosphere under a reduced pressure, and then increasing the pressure of the atmosphere so that the diffraction grating pattern and the material are brought into close contact, while curing the resin. This allows the coating film to be formed in a state of adhering further surely to grooves of the diffraction grating pattern.

Further, it is preferable that the first material is a material having a refractive index lower than that of the second material; and in the step of forming the substrate, the surface is formed by using a die having a copy of the diffraction grating pattern. In the case where the first material has a refractive index lower than that of the second material, a die having a copy of the diffraction grating pattern of the substrate made of the first material can be formed more easily, and the number of pitches in the diffraction grating pattern can be increased. With this, the aberration decreasing effect by the diffraction grating pattern can be increased.

Preferred embodiments of the present invention are described hereinafter with reference to the drawings. The present invention however is not limited to the following embodiments.

Embodiment 1

FIG. 1 is a sectional view of a lens 10 having diffraction grating patterns formed on both surfaces thereof, as an exemplary diffractive optical element of the present invention. A substrate 11 of the lens 10 has a surface 11a, and a surface 11b that is on an opposite side to the surface 11a; on the surface 11a, a ring-form diffraction grating pattern 12a is formed, and on the surface 11b, a ring-form diffraction grating pattern 12b is formed. Further, coating films 13a and 13b are formed so as to cover the diffraction grating patterns 12a and 12b, respectively.

The diffraction grating patterns 12a and the diffraction grating pattern 12b do not necessarily have the same diffraction grating depth and shape. Further, the pitches of rings of the diffraction grating pattern 12a are not necessarily uniform. Still further, the diffraction grating pattern is not necessarily in a ring form, but may be a straight-line or curved-line diffraction grating pattern, or may be a holographic diffraction grating pattern. Materials and thicknesses of the coating films 13a and 13b are not necessarily identical to each other. Regarding the shape of the substrate 11, the substrate 11 does not necessarily have convex surfaces on both sides, but may have a concave surface and a convex surface, concave surfaces on both sides, flat surfaces on both sides, a flat surface and a convex surface, or a flat surface and a concave surface. A diffraction grating pattern may be formed only on one surface.

In the lens 10 of the present embodiment, the substrate 11 is made of a first material, while the coating films 13a and 13b are made of a second material. The first material and the second material contain a resin. At least one selected from the first material and the second material is a composite material containing a resin and inorganic particles.

It should be noted that the composite material may contain a material other than a resin and inorganic particles. For example, a dispersing agent or a curing agent may be contained therein. The content of the materials other than a resin and inorganic particles usually is less than 10 vol %, and preferably less than 1 vol %.

The inorganic particles preferably have an average particle diameter in a range of not less than 1 nm and not more than 100 nm, more preferably in a range of not less than 1 nm and not more than 40 nm. It should be noted that the above-described phrase "an average particle diameter in a range of not less than 1 nm and not more than 100 nm" means, for example, that when the inorganic particles as a whole are measured by a particle size distribution analyzer, the center particle diameter of the particle size distribution is in a range of 1 nm to 100 nm, and 50% or more of the particles of the particle size distribution around the center particle diameter are in the range of 1 nm to 100 nm. If the particle diameters of the inorganic particles are sufficiently smaller than a wavelength of light, the dispersion is excellent, and the composite material can be considered to be a homogeneous medium without variation of the refractive index. It should be noted that if the average particle diameter of inorganic particles is one fourth or more of the wavelength of light, for example, more than 100 nm, the scattering of inorganic particles in the composite material becomes Mie scattering, which impairs the transparency. If the average particle diameter of inorganic particles is less than 1 nm, in the case of a substance that exhibits a quantal effect, an influence is exerted on an optical performance of the substance, for example, emission of fluorescence, in some cases. Accordingly, if the particle diameter of the inorganic particles is in a range of not less than 1 nm and not more than 100 nm, only the Rayleigh scattering occurs, and excellent dispersion is achieved in the composite material, whereby the composite material has high transparency. Besides, additional optical properties such as fluorescence are not exhibited.

It should be noted that the average particle diameter of the inorganic particles can be measured by an image processing method such as the imaging with use of TEM (transmission electron microscope).

The composite material may contain only one type of inorganic particles made of a specific material, or may contain a plurality of types of inorganic particles made of different materials.

For the inorganic particles, a metal oxide may be used, which is, for example, titanium oxide, tantalum oxide, zinc oxide, zirconium oxide, aluminum oxide, yttrium oxide, silicon oxide, niobium oxide, cerium oxide, indium oxide, tin oxide, or hafnium oxide. The inorganic particles may be formed with one of the foregoing oxides, or may be formed with a composite oxide of some of these oxides. Further, as a material for the inorganic particles, the following material may be used: a metal nitride such as silicon nitride; a metal carbonate such as silicon carbonate; or an optically transparent carbon-based material such as diamond or diamond-like carbon. Further, the following material may be used: a sulfide such as sulfur sulfide or tin sulfide; a metal such as gold, platinum, silver, palladium, copper, or aluminum; or a semiconductor material such as silicon or germanium. By using these inorganic particles in combination appropriately, the refractive index and the Abbe's number of the composite material can be adjusted, whereby a diffractive optical element having a high diffraction efficiency with respect to a wide wavelength range can be achieved.

On the other hand, as the resin, those having excellent optical transparency can be used, among resins such as thermoplastic resins, thermosetting resins, and photocurable resins. The following resins are usable also: acrylic resins (e.g. methyl polymethacrylate); epoxy resins; polyester resins (e.g. polyethylene terephthalate, polybutylene terephthalate, and polycaprolactone); polystyrene resins (e.g. polystyrene); polyolefin resins (e.g. polypropylene); polyamide resins (e.g. nylon); polyimide resins (e.g. polyimide, and polyether imide); polyvinyl alcohol resins; butyral resins; fluorene-based resins; and vinyl acetate resins. Further, engineering plastics such as polycarbonate, liquid crystal polymers, polyphenylene ether, polysulfone, polyether sulfone, polyarylate, and amorphous polyolefin are usable also. Still further, mixtures and copolymers of these resins and polymers are usable. Still further, products obtained by modifying these resins are usable.

Among the above-described resins, acrylic resins, epoxy resins, amorphous polyolefin, polycarbonate resins, polyimide resins, and butyral resins have high transparency and excellent moldability in particular.

By selecting the type of the inorganic particles and the content thereof by volume in the composite material, it is possible for the refractive index and the Abbe's number of the composite material to be controlled freely. For example, the refractive index of the composite material can be estimated by Formula 3 shown below, according to the Maxwell-Garnett theory:

$$n_{av}^2 = \frac{n_m^2\{n_p^2 + 2n_m + 2p(n_p^2 - n_m^2)\}}{n_p^2 + 2n_m - p(n_p^2 - n_m^2)}$$ [Formula 3]

where a refractive index $n_{av}$ represents an average refractive index of the composite material, $n_p$ represents a refractive index of the inorganic particles, $n_m$ represents a refractive index of a resin, and P represents a content by volume of the inorganic particles in the composite material. In the case where the inorganic particles absorb light or are made of a metal, a complex refractive index is calculated as the refractive index thereof.

The Abbe's number of the composite material can be determined by calculating refractive indices with respect to the d-line wavelength (587.6 nm), the F-line wavelength (486.1 nm), and the C-line wavelength (656.3 nm), by using Formula 3.

It can be understood from the relationship of Formula 3 that as the content by volume of the inorganic particles increases, the average refractive index and the Abbe's number of the composite material are approximated to the refractive index and the Abbe's number of the inorganic particles from the refractive index and the Abbe's number of the resin.

It should be noted that in this specification, "the refractive index of the composite material" means an effective refractive index of the composite material when the composite material is considered to be a medium having one refractive index. Besides, the actual refractive index of the composite material can be determined by measurement using, for example, the ellipsometry method, the Abeles method, the optical waveguide method, the spectral reflectance method, etc., after the completion of the substrate 11 or the coating films 13a and 13b.

In the case where the above-described composite material is a material obtained by dispersing and mixing zirconium oxide as inorganic particles in a resin containing cycloolefin-based resin as a principal component so that the content of zirconium oxide is 50 vol %, the composite material has a d-line refractive index of 1.796, and an Abbe's number of 41.9. Zirconium oxide has a d-line refractive index of 2.096 and an Abbe's number of 35.4, that is, it is a material that has a relatively high refractive index and a relatively high Abbe's number. Therefore, by homogeneously dispersing fine particles of zirconium oxide in a resin, a material having a high refractive index and a high Abbe's number can be realized easily. The resin is not limited to a cycloolefin-based resin, but it is particularly desired to use a resin material having a relatively high Abbe's number in the combination. Examples of the inorganic particles having such a high Abbe's number include aluminum oxide and yttrium oxide also.

On the other hand, in the case where the above-described composite material is a material obtained by dispersing and mixing zinc oxide as inorganic particles in a resin containing polycarbonate as a principal component so that the content by volume of zinc oxide is 30 vol %, the composite material has a d-line refractive index of 1.683, and an Abbe's number of 18.9. Zinc oxide has a d-line refractive index of 1.921 and an Abbe's number of 12.2, that is, it is a transparent inorganic material that has a medium-level refractive index and a relatively low Abbe's number. Therefore, by using a composite material obtained by homogeneously dispersing fine particles of zinc oxide in a resin, a material having a low refractive index and a low Abbe's number can be realized easily. The resin is not limited to a polycarbonate resin, but it is particularly desired to use a resin material having a relatively low Abbe's number in the combination.

In the case where the first material is the composite material, the substrate 11 having the surfaces 11a and 11b on which the diffraction grating patterns 12a and 12b are formed, respectively, can be mass-manufactured easily by molding with use of dies. As one exemplary method of processing the dies, the following method is available: plating films are formed on surfaces of die materials, and the plating film is subjected to processing by diamond-tool turning so that dies having copies of the diffraction grating patterns 12a and 12b are formed. In the case where a thermoplastic resin such as carbonate or a cycloolefin-based resin is mixed in the composite material, the substrate 11 made of the composite material can be formed easily by injection molding. Alternatively, in the case where, for example, a photocurable resin is mixed in the composite material, the substrate 11 made of the composite material can be formed easily by a method in which the photocurable resin is cured by irradiation of ultraviolet radiation or visible radiation and is released, which is a so-called photopolymer molding. A die used in the method may be formed by forming step-like patterns (inverted patterns of the diffraction grating patterns 12a and 12b) on a material that transmits ultraviolet radiation or visible radiation, such as quartz, by dry etching or the like.

In contrast, a conventional lens disclosed in the above-described Patent Document 1 or 2 is difficult to manufacture, since glass is used therein as a constituent material of a substrate or a coating film of the lens. In a lens formed by using a glass member and a resin member in combination, it is difficult to form a substrate with a resin while forming a coating film with glass. The reason is that if a glass-made coating film with a thickness of more than several micrometers is formed on a resin, either the substrate or the coating film cracks. Besides, with regard to productivity, a substrate made of glass is significantly inferior to a substrate made of a resin. Press molding with use of dies is the most promising method with regard to productivity, but the durability of the dies is $1/10$ to $1/100$ as compared with the durability of dies in the resin-used molding, and hence, this is significantly disadvantageous from the viewpoints of economy and mass production, as compared with resins.

Further, the conventional lens disclosed in the Patent Document 3 described above is configured by combining polycarbonate and polystyrene so that the wavelength dependence of the diffraction efficiency is eliminated by a specific combination of resins, and this requires a diffraction grating depth of approximately 280 μm. Normally, in the forming of a diffraction grating pattern with a depth of more than several tens of micrometers, it is difficult to perform die processing with high processing accuracy. This is because the die processing is performed usually by using a bite, but if a diffraction grating depth is great, an amount of processing increases, and a bite tip is worn out, which degrades the processing accuracy. At the same time, if a diffraction grating depth is great, the grating pitches cannot be narrowed. This is because if the diffraction grating depth is increased, it is necessary to process a die with use of a bite whose tip has a greater radius of curvature, and as a result, the processing of a diffraction grating pattern cannot be performed unless each pitch of diffraction gratings is widened to some extent. This causes the degree of freedom in the designing of diffraction grating patterns to decrease as the diffraction grating depth increases, and the aberration decreasing effect achieved by the diffraction grating patterns is almost canceled. Still further, since a refractive index difference between polycarbonate and polystyrene varies as the ambient temperature varies, the wavelength dependence of the diffraction efficiency tends to occur, along with the variation of the ambient temperature. It should be noted that in order to achieve the easiness of the die processing, the contribution to lens performances by the diffraction grating patterns 12a and 12b, and the stability with respect to the ambient temperature, it is desirable to set the depth of grooves of the diffraction grating patterns 12a and 12b to not more than 20 μm.

In the case where the dies are processed by the diamond-tool turning and the diffraction grating patterns 12a and 12b are formed by a molding method with use of these dies, even if they are the blazed diffraction grating patterns 12a and 12b having the same depth, the degrees of difficulty in the die processing differs depending on the tilt direction of the blaze. For this reason, it is preferable to use a material having a low refractive index and a low Abbe's number for the substrate 11, and to use a material having a high refractive index and a high Abbe's number for the coating films 13a and 13b. This makes the die processing easier and allows high processing accuracy. Therefore, even if the blaze depth is increased, each pitch of the diffraction gratings can be narrowed, whereby the number of pitches can be increased. By so doing, the aberration decreasing effect by the diffraction grating patterns 12a and 12b can be increased.

By using a composite material containing a resin and inorganic particles in at least one of the material for the substrate 11 and the material for the coating films 13a and 13b, like in the lens 10 of the present embodiment, a diffractive optical element that can be manufactured easily and is excellent in optical performances can be obtained. In this case, the substrate 11 and the coating films 13a and 13b are made of materials containing at least a resin.

In the present embodiment, in the case where the substrate 11 is a composite material, the content by volume of the inorganic particles in the composite material preferably is in a range of not less than 5 vol % and not more than 50 vol %, and more preferably in a range of not less than 10 vol % and not more than 40 vol %, from the viewpoint of moldability. Even a composite material containing inorganic particles in a very small content by volume of less than 5 vol % exhibits excellent optical properties in some cases, depending on the type of the inorganic particles. However, generally, if the content by volume of inorganic particles is less than 5 vol %, a composite material that exhibits properties deviating from conventional refractive index and dispersion properties of resins cannot be obtained, and hence, the diffraction grating depth cannot be decreased. Further, if the content by volume of the inorganic particles exceeds 50 vol %, the light transmittance of the composite material decreases, and the influence of the same becomes noticeable in some cases. By satisfying the foregoing range requirement, further high moldability can be achieved, and a diffractive optical element can be designed so as to have less wavelength dependence of the diffraction efficiency and have a relatively smaller diffraction grating depth.

The foregoing composite material has physical property values intermediate between those of a resin and those of inorganic particles, regarding the thermal expansion coefficient and the temperature dependence of the refractive index. Therefore, the temperature dependence of optical properties, which frequently becomes a problem when the first material and the second material are resins, is reduced, whereby the composite material is significantly superior to a resin regarding the reliability and the optical stability. This is because inorganic particles generally have smaller temperature dependence of the thermal expansion coefficient and the refractive index, as compared with a resin.

Further, in the case where the second material is a composite material, a hard-coating effect can be achieved. More specifically, since surfaces are protected with hard films containing inorganic particles, reliability is improved, and surfaces resistant to scratches are obtained.

Still further, in the case where the first material contains a thermoplastic resin and the diffraction grating patterns 12a and 12b are formed by injection molding, an effect of suppressing the occurrence of birefringence can be achieved by dispersing inorganic particles in a resin. This is because the inorganic particles prevent the resin from being aligned upon injection molding, whereby optical isotropy can be maintained.

Still further, at least one material selected from the first material and the second material preferably is a material that absorbs light having a wavelength in an infrared radiation range. By so doing, a diffractive optical element having an infrared radiation blocking effect can be obtained easily. In this case, when the element is used in combination with an imaging element or a sensor that needs the blocking of infrared radiation, such as a CCD (charge coupled device) or a CMOS (complementary metal-oxide semiconductor), it is unnecessary to use an infrared radiation cut filter separately. As a material that absorbs light having a wavelength in the infrared radiation range, for example, a material containing a substance that absorbs light having a wavelength in an infrared radiation range may be used; such a material is, for example, a resin in which a complex salt of a metal ion such as copper ion is mixed, a resin in which a dye such as a cyanine dye that absorbs radiation in a near-infrared radiation wavelength range is dissolved, or a material containing inorganic particles made of indium tin oxide (ITO) or the like.

Still further, at least one material selected from the first material and the second material preferably is a material that absorbs light having a wavelength in an ultraviolet radiation range. This is because a diffractive optical element having an ultraviolet radiation blocking effect can be obtained easily. As a material that absorbs ultraviolet radiations, for example, a material in which an appropriate amount of inorganic particles of titanium oxide, zinc oxide, cerium oxide, tungsten oxide, or the like are dispersed may be used. In this case, it is possible to ensure the transparency with respect to light in the visible radiation range, while achieving the absorption of light in the ultraviolet radiation range. Therefore, it is possible to ensure light resistance, and to prevent the generation of unnecessary fluorescence from the resin.

It should be noted that the diffractive optical element of the present invention is not applied exclusively to the lens 10 according to Embodiment 1, but may be applied widely to optical devices in which a diffraction grating pattern is used, such as a spatial low-pass filter or a polarizing hologram. When the refractive index of the first material is greater than that of the second material in the entire range of visible radiation wavelengths (400 to 700 nm) or when the refractive index of the first material is smaller than that of the second material in the entire range of visible radiation wavelengths (400 to 700 nm) in particular, the wavelength dependence of the diffraction efficiency can be reduced.

At least one selected from the coating films 13a and 13b preferably is configured so that a surface thereof on a side opposite to the diffraction grating pattern 12a or 12b side is in an antireflection form having nano-order projections and recesses. This is because the reflection of light can be reduced further. This surface form can be obtained easily by, for example, a transfer method using dies (nanoimprinting) or the like.

Embodiment 2

The following is a description of a diffractive optical element according to Embodiment 2 of the present invention. Concerning the lens configuration, the composite material, and the effects in terms of manufacture and performance, descriptions of the same contents as those of Embodiment 1 are omitted herein.

Figure 2:
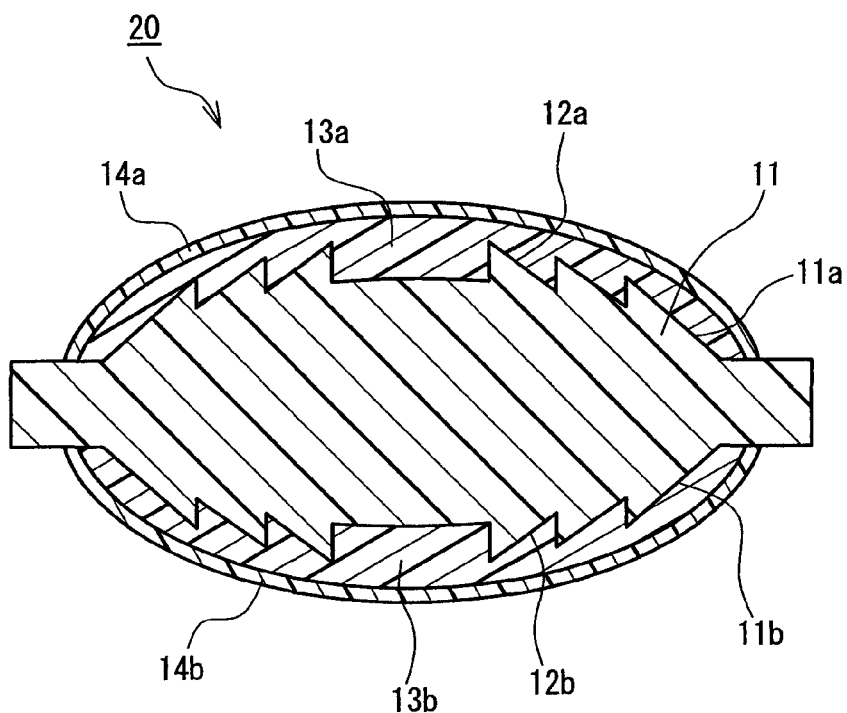
FIG. 2 is a sectional view showing a diffractive optical element according to Embodiment 2 of the present invention.

FIG. 2 is a sectional view of a lens 20 as an exemplary diffractive optical element of the present invention. The lens 20 according to the present embodiment further includes an antireflection film 14a provided on a surface of the coating film 13a on a side opposite to the diffraction grating pattern 12a, and an antireflection film 14b provided on a surface of the coating film 13b on a side opposite to the diffraction grating pattern 12b, in addition to the constituent elements of the above-described lens 10. This configuration allows the lens 20 to exhibit the same effects as those of the lens 10 described above, and further, reduces light subjected to total reflection among light entering the lens 20, whereby the diffraction efficiency can be increased.

The antireflection films 14a and 14b are not necessarily made of the same material, but may be made of either a resin or a composite material composed of a resin and inorganic particles, or alternatively, may be inorganic thin films formed by vacuum deposition or the like.

Assuming the refractive index of the coating film 13a (13b) with respect to a wavelength $\lambda_c$ around the center of a used wavelength band of the lens 20 to be $n_c$, the reflectance with respect to vertical light becomes approximately 0 when the refractive index of the antireflection film 14a (14b) formed on the foregoing coating film 13a (13b) is a square root of $n_c$ and a thickness thereof is $\lambda_c/4n_c$. On the other hand, without the antireflection film 14a (14b), reflection loss of $\{(n_c-1)/(n_c+1)\}^2$ per one surface is generated with respect to light rays passing from air to the coating film 13a (13b), or reversely from the coating film 13a (13b) to air. It should be noted that the reflectance when the antireflection film 14a (14b) is added does not become 0 if the thickness and the refractive index of the antireflection film 14a (14b) are deviated from ideal values. However, if the refractive index of the antireflection film 14a (14b) is lower than that of the coating film 13a (13b), the reflectance by no means becomes greater than the reflectance when the antireflection film 14a (14b) is not present, i.e., $\{(n_c-1)/(n_c+1)\}^2$. Therefore, the reflection decreasing effect can be achieved, irrespective of the film thickness of the antireflection film 14a (14b).

As the antireflection films 14a and 14b, single-layer films or multi-layer films may be formed of an inorganic material by vacuum deposition or the like. Further, the above-described composite material preferably is used for forming the antireflection films 14a and 14b. This is because the manufacture is easy. Besides, since at least one of the substrate 11 and the coating films 13a and 13b is made of the composite material, the thermal expansion coefficient thereof and that of the antireflection films 14a and 14b can be approximated to each other, whereby the property stability with respect to ambient temperature is improved, and cracking or film peeling is reduced. Silicon oxide preferably is used for the inorganic particles in the composite material, since excellent light transmittance is achieved, and silicon oxide has a low refractive index and a high Abbe's number as an inorganic material (d-line refractive index: 1.456, Abbe's number: 68.4). In this case, an antireflection effect can be achieved in a wide wavelength band.

The following is a description of a preferred method for manufacturing the lens 20 according to Embodiment 2. FIGS. 3, 4, and 5 are sectional views showing respective steps of the manufacturing method.

Figure 3A:
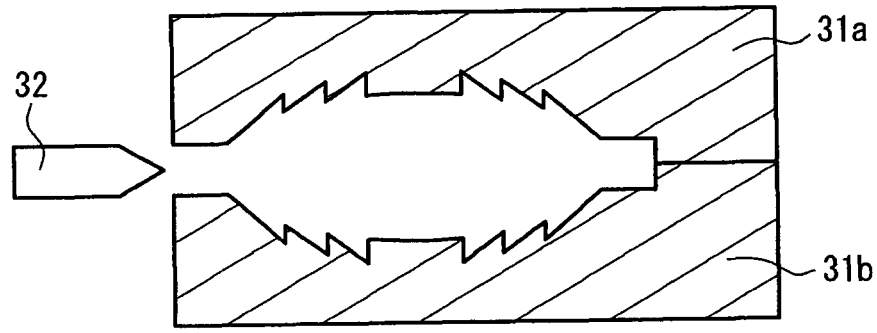
FIGS. 3A to 3C are sectional views respectively showing steps of a preferable method for manufacturing the diffractive optical element according to Embodiment 2 of the present invention.
Figure 3B:
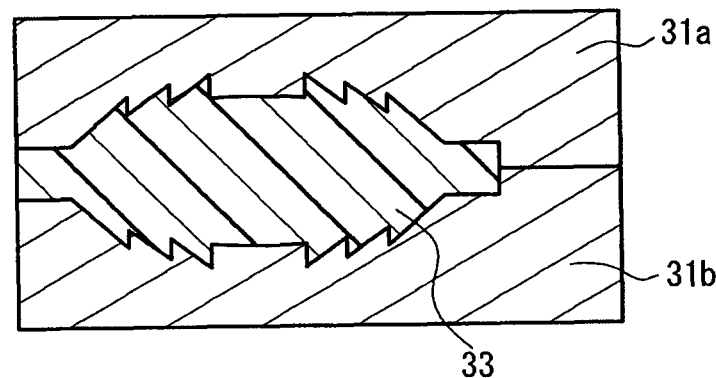
Figure 3C:
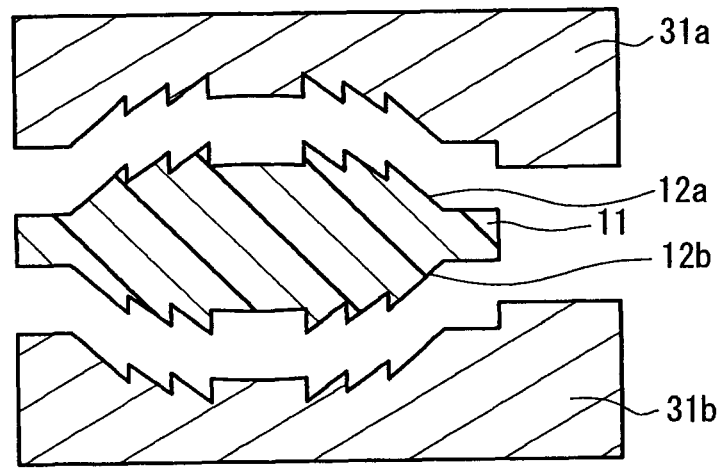

First, as shown in FIG. 3A, dies 31a and 31b on which copies of the diffraction grating patterns 12a and 12b (see FIG. 2) are prepared. Then, as shown in FIG. 3B, the first material 33 in a non-cured state is poured into the dies 31a and 31b from a vacuum injection nozzle 32 (see FIG. 3A) so that the dies are filled. Then, as shown in FIG. 3C, the dies 31a and 31b are removed. Thus, the substrate 11 is formed, having surfaces on which the diffraction grating patterns 12a and 12b are formed. The step for forming the substrate 11 made of the first material is not limited to the molding process using dies. For example, in the case where the first material contains a thermoplastic resin as a principal component, injection molding may be used; in the case where the first material contains a photocurable resin as a principal component, photopolymer molding or the like may be used.

Figure 4A:
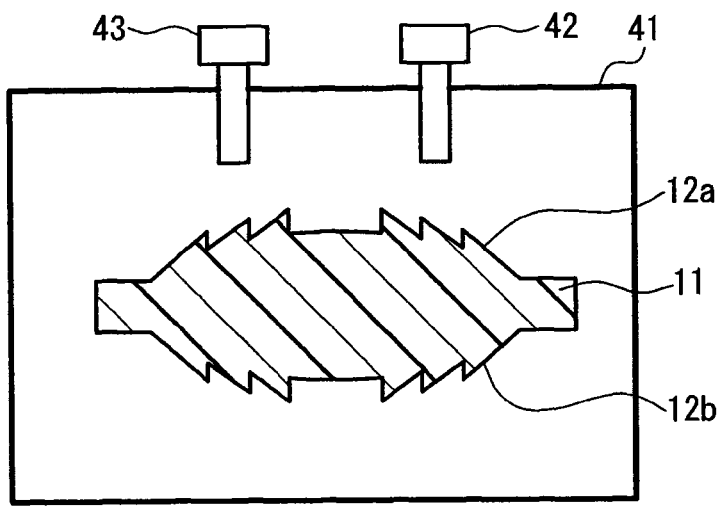
FIGS. 4A to 4C are sectional views respectively showing steps of a preferable method for manufacturing the diffractive optical element according to Embodiment 2 of the present invention.

Next, as shown in FIG. 4A, the substrate 11 is placed in an airtight container 41 having vacuum injection nozzles 42 and 43, and pressure in the airtight container 41 is reduced. It is not necessary to reduce the pressure in the airtight container 41 to a level required in a vacuum process such as vacuum deposition or CVD. A sufficient effect can be achieved under a pressure of, for example, 1 Pa to 5000 Pa, and the pressure preferably is not more than 100 Pa.

Figure 4B:
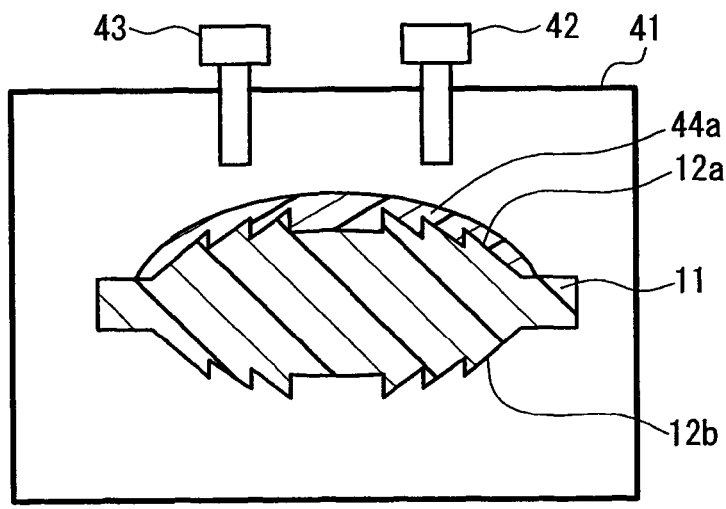
Figure 4C:
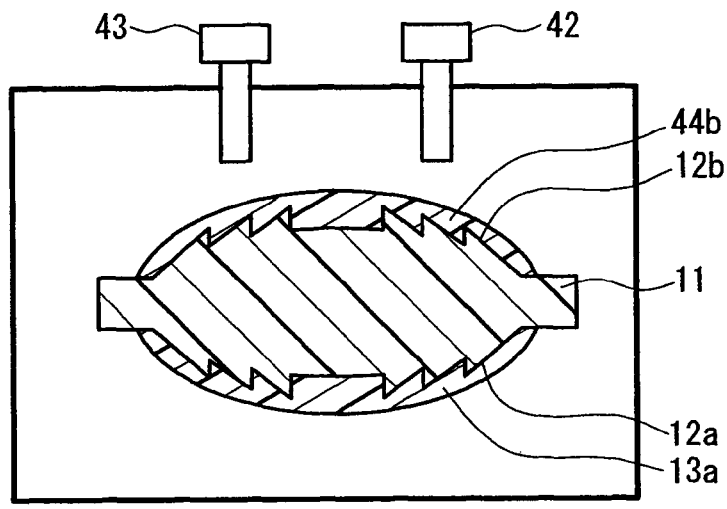

Next, as shown in FIG. 4B, in the pressure-reduced airtight container 41, an application liquid 44a for forming the coating film 13a made of the second material is supplied through the vacuum injection nozzle 42, and is applied over the surface of the substrate 11 on which the diffraction grating pattern 12a is formed. Then, the pressure in the airtight container 41 is increased to the level before the pressure reduction so that bubbles are removed from the application liquid 44a and the application liquid 44a is caused to closely adhere to finely formed portions of the diffraction grating pattern 12a so that no interstice is formed therebetween. Thus, the coating film 13a (see FIG. 4C) is formed. Next, as shown in FIG. 4C, the substrate 11 is inverted, and the pressure in the airtight container 41 is reduced. An application liquid 44b for forming the coating film 13b made of the second material is supplied through the vacuum injection nozzle 42, and is applied over the surface of the substrate 11 on which the diffraction grating pattern 12b is formed. Then, as is the case with the coating film 13a, the pressure in the airtight container 41 is increased. Thus, the coating film 13b is formed.

Figure 5A:
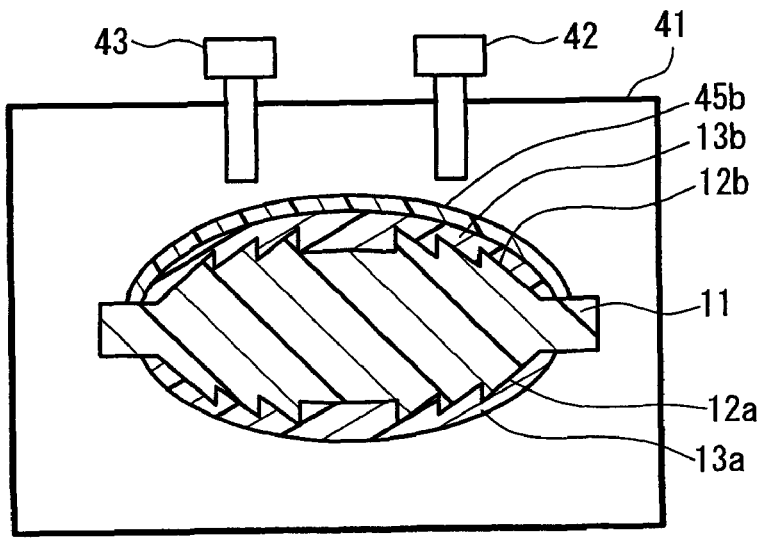
FIGS. 5A to 5C are sectional views respectively showing steps of a preferable method for manufacturing the diffractive optical element according to Embodiment 2 of the present invention.
Figure 5B:
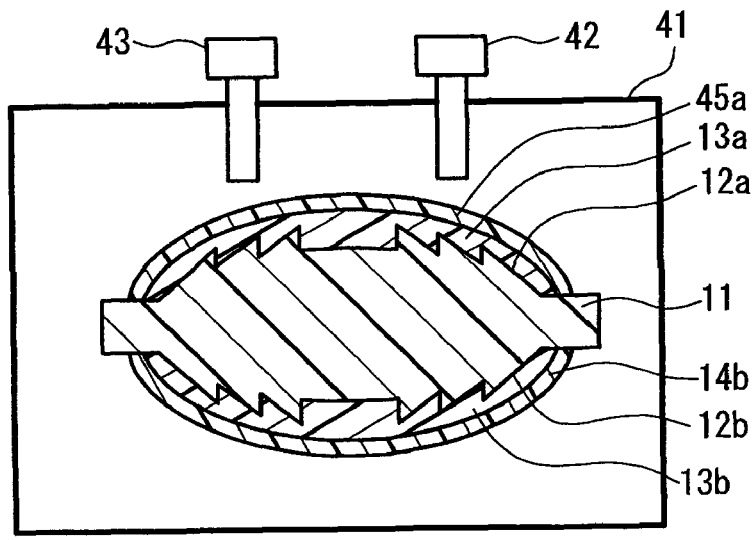
Figure 5C:
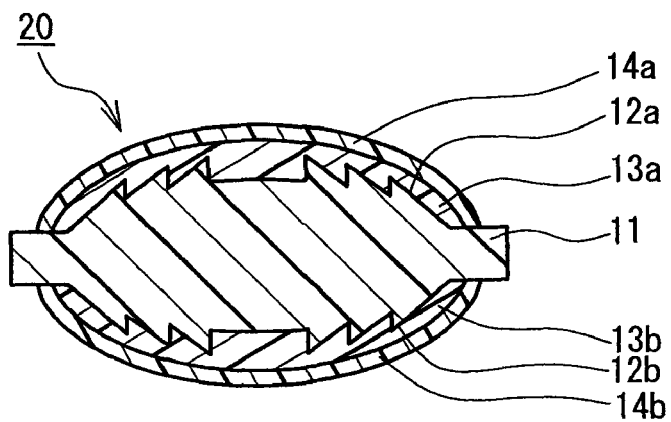

Further, the pressure in the airtight container 41 is reduced, and as shown in FIG. 5A, an application liquid 45b for forming the antireflection film 14b made of the third material is supplied through the vacuum injection nozzle 43, and is applied over the surface on which the coating film 13b is formed. By increasing the pressure in the airtight container 41 to a level before the pressure reduction, bubbles are removed from the application liquid 45b and the application liquid 45b is caused to adhere closely to the coating film 13b. Thus, the antireflection film 14b (see FIG. 5B) is formed. Next, as shown in FIG. 5B, the substrate 11 is inverted, and the pressure in the airtight container 41 is reduced. An application liquid 45a for forming the antireflection film 14a made of the third material is supplied through the vacuum injection nozzle 43, and is applied over the surface on which the coating film 13a is formed. Then, as is the case with the antireflection film 14b, the pressure in the airtight container 41 is increased. Thus, the antireflection film 14a is formed, and the lens 20 shown in FIG. 5C is completed.

The process for forming the coating films 13a and 13b may include the steps of placing the application liquids 44a and 44b for forming the coating films 13a and 13b made of the second material over surfaces of the diffraction grating patterns 12a and 12b in an ambient atmosphere under reduced pressure, and the steps of increasing the pressure in the ambient atmosphere so that the application liquids 44a and 44b are caused to adhere closely to the diffraction grating patterns 12a and 12b so that no interstice is formed therebetween. By using such a method, the lens 20 is formed so that no interstice is present between the grooves of the diffraction grating patterns 12 and 12b on the surfaces of the substrate 11 and the coating films 13a and 13b, and no bubble remains in the coating films 13a and 13b. In the steps for forming the coating films 13a and 13b and the antireflection films 14a and 14b, the following process may be used: spin-coating, dip-coating, or the like is used for application, and thereafter the liquid thus applied is cured by heating, photocuring, natural curing, or the like.

Only at least one of the first and second materials is required to be a composite material, and preferably both of the first and second materials are composite materials. The method for preparing a composite material is not limited particularly, and the material may be prepared by a physical method or a chemical method. For example, a composite material may be prepared by any one of the methods (1) to (4) shown below:

Method (1): a resin or a solution in which a resin is dissolved, and inorganic particles having a primary particle diameter of less than 1 µm, are mixed mechanically/physically.

Method (2): a mixture is obtained by mixing mechanically/physically a raw material for a resin (monomer, oligomer, etc.) and inorganic particles having a primary particle diameter of less than 1 µm, and thereafter, the raw material for the resin is polymerized. The polymerization may be carried out after the mixture is applied over a lens, or before the application.

Method (3): after a resin or a solution in which a resin is dissolved, and a raw material for inorganic particles are mixed, the raw material for the inorganic particles is caused to react, so that the inorganic particles are formed in the resin.

Method (4): after mixing a raw material for a resin (monomer, oligomer, etc.) and a raw material for inorganic particles, the following two steps are carried out: a step of causing the raw material for the inorganic particles to react so that the inorganic particles are synthesized; and a step of polymerizing the raw material for the resin so that the resin is synthesized.

Among those described above, the methods (1) and (2) have the following advantage: since various types of preliminarily formed inorganic particles are usable, a composite material can be prepared by using a general-purpose dispersing apparatus.

On the other hand, in the methods (3) and (4), a chemical reaction has to be carried out, and materials are limited accordingly. However, these methods have an advantage of allowing the raw materials to be mixed at the molecular level, thereby improving the dispersion of inorganic particles.

In the above-described methods, the order in which inorganic particles or a raw material for inorganic particles, and a resin or a raw material for a resin are mixed is not limited particularly, and a preferable order may be selected appropriately. For example, either a resin, a raw material for a resin, or a solution in which the same is dissolved, is added and mixed mechanically/physically into a solution in which inorganic particles having a first-order particle diameters substantially in a range of 1 nm to 100 nm are dispersed.

Further, the third material is not limited particularly, but preferably has a refractive index lower than that of the second material. For example, a material containing a resin and inorganic particles may be used.

The following is a description of an exemplary method for forming the coating films 13a and 13b in the case where the above-described composite material is used as the second material. The coating films 13a and 13b can be formed using a mixture (e.g. application liquid) containing substances for forming the composite material. This mixture (application liquid) contains a resin or a raw material for a resin, inorganic particles, and a solvent (dispersion medium). The coating films 13a and 13b may be formed using a mixture that does not contain a solvent. In this case, a mixture that contains a thermoplastic resin and is caused to have a low viscosity by temperature rise is used, or alternatively, a mixture in a film form may be used. The application liquid can be prepared by, for example, any one of the methods (1) to (4) shown below:

Method (1): an application liquid is prepared by diluting a composite material with a solvent. In the case where this application liquid is used, the solvent is removed after the application liquid is applied.

Method (2): an application liquid is prepared by mixing a monomer, an oligomer, or a low-molecular-weight polymer of a resin, and inorganic particles. In the case where this application liquid is used, it is necessary to cause a raw material such as a monomer, an oligomer, or a low-molecular-weight polymer to react so that the resin is synthesized.

Method (3): an application liquid is prepared by mixing a raw material for inorganic particles, a resin, and a solvent. In the case where this application liquid is used, after the application liquid is applied, the raw material for inorganic particles is caused to react by a sol-gel process or the like, so that inorganic particles are synthesized in the film thus applied.

Method (4): an application liquid is prepared by dispersing inorganic particles in a resin that is heated so as to have a lower viscosity. In this method, the applied film becomes hardened as the temperature of the film lowers, whereby the coating films 13a and 13b are formed.

One may be selected from these methods appropriately according to the materials of the resin and the inorganic particles, the application method, and the like. It should be noted that the application liquid may contain a cross-linking agent, a polymerization initiator, a disperser, etc. as required.

A method for placing the mixture over surfaces of the diffraction grating patterns 12a and 12b is not limited particularly, and, for example, a known method may be used. More specifically, the following are applicable: application with use of an injection nozzle of a dispenser; a jetting application such as the ink jet method; application by rotation, such as spin coating; application by squeezing, such as printing; and transferring. Such a method can be carried out by using already-existing equipment.

After an application liquid is applied, a solvent is removed, whereby the coating films 13a and 13b are formed. It should be noted that in the case where an application liquid contains a material for a resin (monomer, oligomer, etc.), and a material for inorganic particles, they may be caused to react after the application as required, so that the resin and the inorganic particles may be synthesized. The coating films 13a and 13b may be formed by curing films that have been formed by applying an application liquid. The curing can be carried out by photocuring, thermosetting, drying, or the like.

The following is a description of another method for forming the coating films 13a and 13b and the antireflection films 14a and 14b, with reference to FIGS. 6 and 7.

Figure 6A:
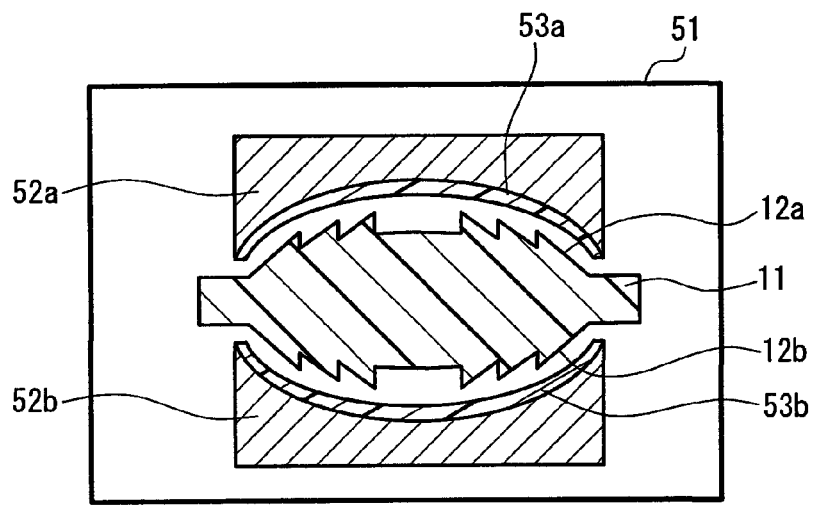
FIGS. 6A to 6C are sectional views respectively showing steps of another preferable method for manufacturing the diffractive optical element according to Embodiment 2 of the present invention.

As shown in FIG. 6A, a substrate 11 having surfaces on which diffraction grating patterns 12a and 12b are formed is placed in an airtight container 51, and the pressure in the airtight container 51 is reduced. Transfer plates 52a and 52b are prepared, on which application films 53a and 53b for forming the coating films 13a and 13b made of the second material are formed, respectively.

Figure 6B:
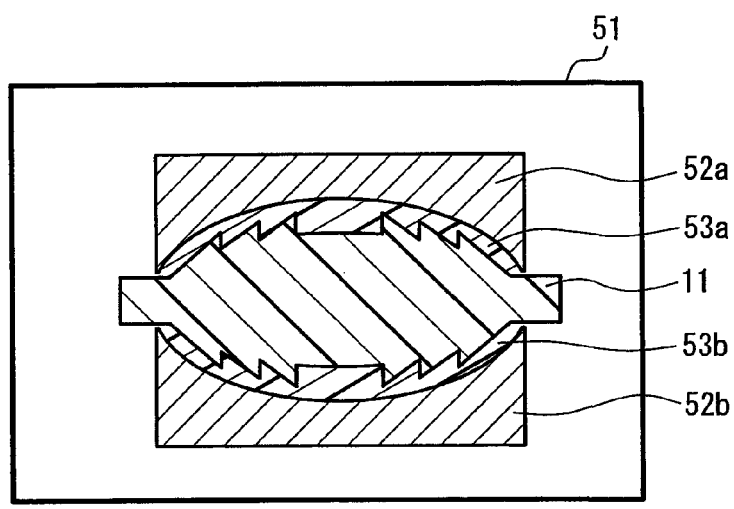
Figure 6C:
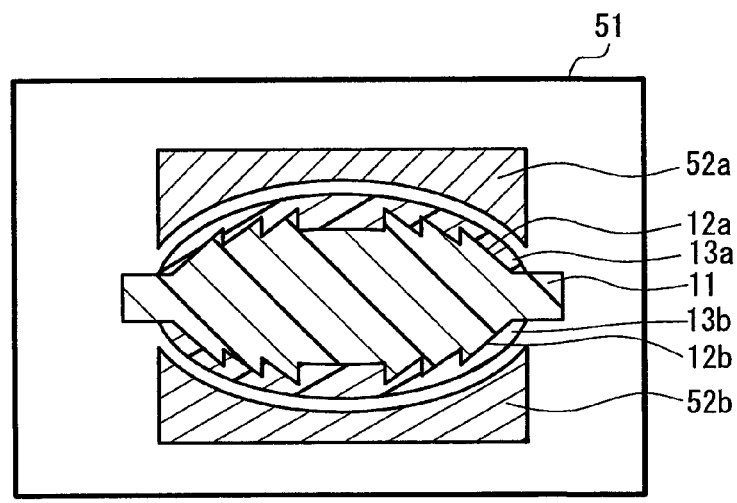

Next, as shown in FIG. 6B, in the airtight container 51 under reduced pressure, the application films 53a and 53b on the transfer plates 52a and 52b are brought in close contact with the diffraction grating patterns 12a and 12b on surfaces of the substrate 11, so as to be transferred thereto. Next, as shown in FIG. 6C, by increasing the pressure in the airtight container 51 to a level before the pressure reduction, a solvent contained in the application films 53a and 53b is removed. Thus, the coating films 13a and 13b are obtained.

Figure 7A:
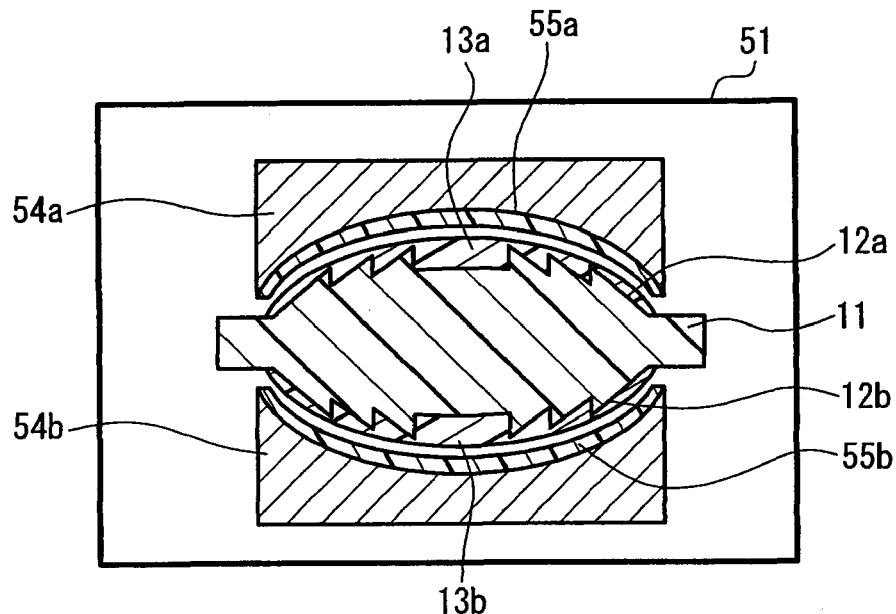
FIGS. 7A to 7C are sectional views respectively showing steps of another preferable method for manufacturing the diffractive optical element according to Embodiment 2 of the present invention.
Figure 7B:
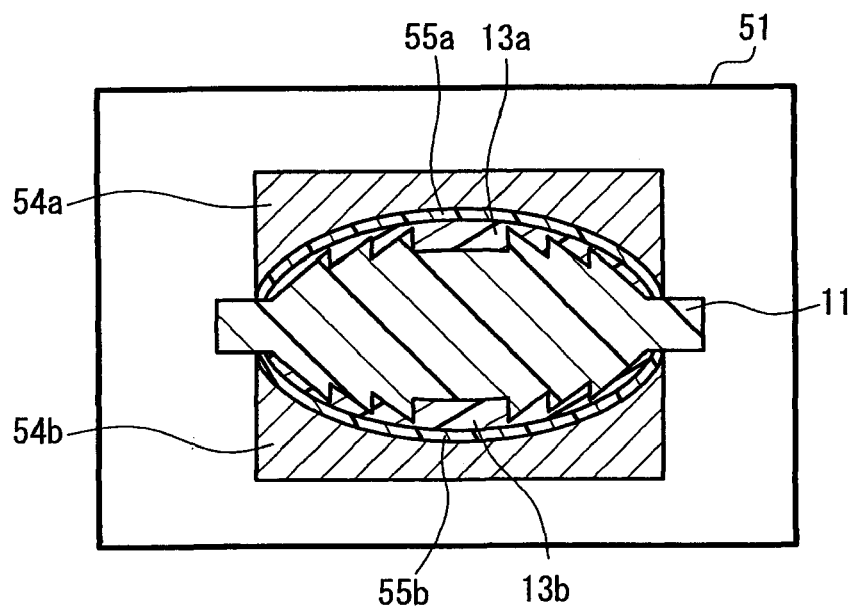
Figure 7C:
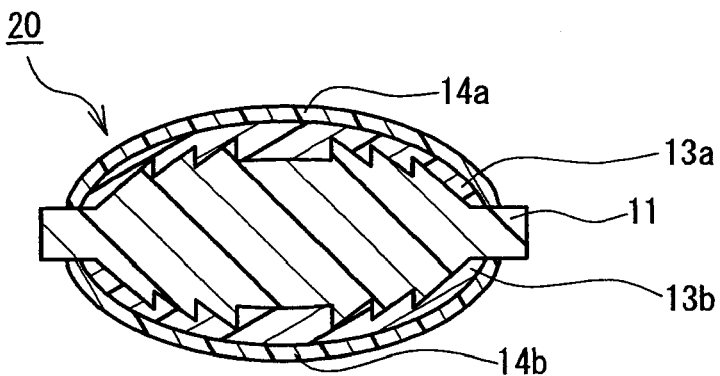

Further, as shown in FIG. 7A, transfer plates 54a and 54b are prepared, on which application films 55a and 55b for forming the antireflection films 14a and 14b made of the third material are formed, respectively. As shown in FIG. 7B, the transfer plates 54a and 54b are brought in close contact with surfaces on which the coating films 13a and 13b are formed, so that the application films 55a and 55b are transferred thereto. Finally, as shown in FIG. 7C, a solvent contained in the application films 55a and 55b is removed in the atmosphere so that the antireflection films 14a and 14b are formed. Thus, the lens 20 is completed.

When the application films 53a, 53b, 55a, and 55b are formed, spin coating with respect to the transfer plates 52a, 52b, 54a, and 54b may be performed. In this case, the film thicknesses thereof are adjustable. By using thin films of film thicknesses of approximately several tens μm, the removal of bubbles from the application films 53a, 53b, 55a, and 55b is made further easier. When the transfer plates 52a, 52b, 54a, and 54b are brought in close contact, they may be pressed with an appropriate pressure being applied thereto.

The above-described steps for forming the coating films 13a and 13b and the antireflection films 14a and 14b can be carried out at a relatively low temperature. Therefore, these steps are particularly preferable in the manufacture of diffractive optical element such as a lens in which a low-temperature process is required.

Figure 8:
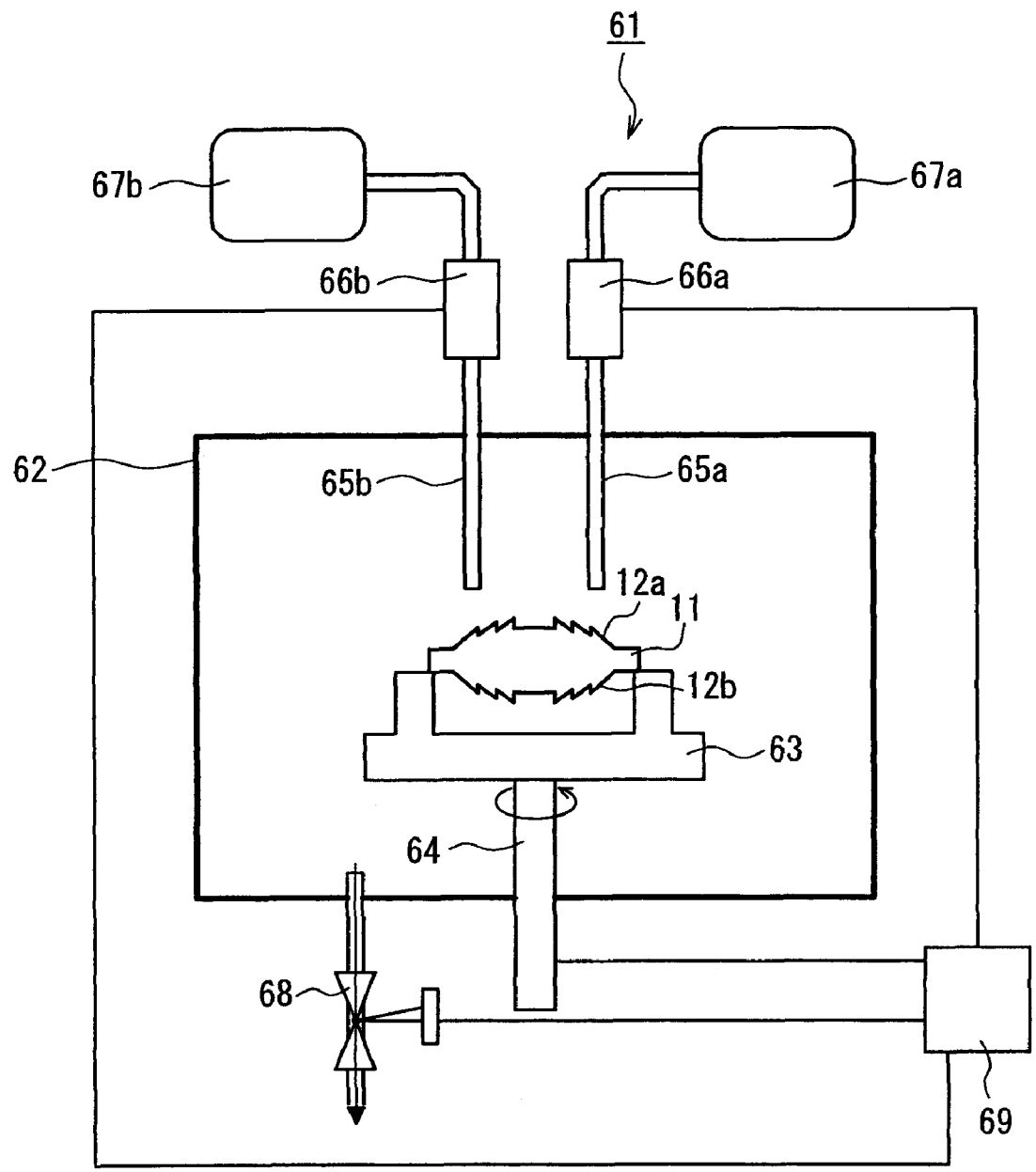
FIG. 8 shows a configuration of a preferable manufacturing apparatus used in the method for manufacturing the diffractive optical element according to Embodiment 2 of the present invention.

The following is a description of a preferable manufacturing apparatus used in the above-described method for manufacturing the lens 20. FIG. 8 shows a configuration of the manufacturing apparatus.

A manufacturing apparatus 61 includes an airtight container 62, a substrate holding stage 63 for holding the substrate 11, a substrate rotating mechanism 64, vacuum injection nozzles 65a and 65b, vacuum injectors (heads) 66a and 66b, application liquid tanks 67a and 67b, a pressure control valve 68, and a control device 69.

The airtight container 62 is a container capable of maintaining a reduced-pressure state, and is connected with a pressure reducing device such as a vacuum pump (not shown). The substrate holding stage 63 can be rotated by the substrate rotating mechanism 64. The vacuum injection nozzle 65a, the vacuum injector (head) 66a, and the application liquid tank 67a constitute an application device for forming the coating films 13a and 13b. An application liquid for forming the coating films 13a and 13b is contained in the application liquid tank 67a. The vacuum injection nozzle 65b, the vacuum injector (head) 66b, and the application liquid tank 67b constitute an application device for forming the antireflection films 14a and 14b. An application liquid for forming the antireflection films 14a and 14b is contained in the application liquid tank 67b. The pressure control valve 68 adjusts the pressure in the airtight container 62. The airtight container 62, the pressure reducing device, and the pressure control valve 68 constitute a pressure adjusting device. These devices are controlled by the control device 69.

The following describes an exemplary method for manufacturing the lens 20 using the manufacturing apparatus 61. First, a substrate 11 having surfaces on which diffraction grating patterns 12a and 12b are formed is fixed on the substrate holding stage 63. The fixing method may be a known method, for example, bonding with use of a bond or an adhesive, fixing with use of a jig, fixing with use of static electricity, or vacuum chucking. In the case of vacuum chucking, it is necessary to reduce the pressure in the chuck to be lower than the pressure in the airtight container 62.

Next, the pressure in the airtight container 62 is reduced by the pressure reducing device and the pressure control valve 68, and thereafter an application liquid is applied over the surface of the substrate 11 on which the diffraction grating pattern 12a is formed, with use of the vacuum injection nozzle 65a and the vacuum injector (head) 66a. Here, the application liquid is applied uniformly while the substrate holding stage 63 is rotated at a low speed by the substrate rotating mechanism 64. Then, the substrate 11 is rotated at a high speed by the substrate rotating mechanism 64 so that an excess of the application liquid applied over the surface is removed. The pressure in the airtight container 62 is increased to a previous level, and the application liquid thus applied is cured. As a result, the coating film 13a is formed. This series of processes, i.e., the pressure reduction process, the application process, and the pressure increasing process, is controlled by the control device 69. Then, the substrate 11 is inverted, and in the same manner as that for the coating film 13a, the coating film 13b is formed on the surface of the substrate 11 on which the diffraction grating pattern 12b is formed.

Next, the pressure in the airtight container 62 is reduced by the above-described pressure reducing device and the pressure control valve 68, and thereafter the application liquid is applied over the surface of the substrate 11 on which the coating film 13a is formed, with use of the vacuum injection nozzle 65b and the vacuum injector (head) 66b. Here, the application liquid is applied uniformly while the substrate holding stage 63 is rotated at a low speed by the substrate rotating mechanism 64. Then, the substrate 11 is rotated at a high speed by the substrate rotating mechanism 64 so that an excess of the application liquid applied over the surface is removed. The pressure in the airtight container 62 is increased to a previous level, and the application liquid thus applied is cured. As a result, the antireflection film 14a is formed. Next, the substrate 11 is inverted, and in the same manner as that for the antireflection film 14a, the antireflection film 14b is formed on the surface of the substrate 11 on which the coating film 13b is formed. Thus, the lens 20 is completed.

In the case where, for example, the second material for forming the coating films 13a and 13b is a composite material, the manufacturing apparatus 61 may include an application device for applying an application liquid containing a substance for forming the composite material to a predetermined position under a reduced pressure, and a pressure adjusting device for reducing a pressure in the atmosphere in which the application liquid is applied. As the application device, a device for carrying out the above-described application method can be used; such a device is, for example, a vacuum injector, a spin coater, a screen printer, a dispensing device, an ink-jet device, or the like. As the pressure adjusting device, a known device can be used, which is, for example, a device including an airtight container whose airtight state can be shifted to a non-airtight state, and a pressure reducing device connected with the airtight container.

Embodiment 3

Figure 9:
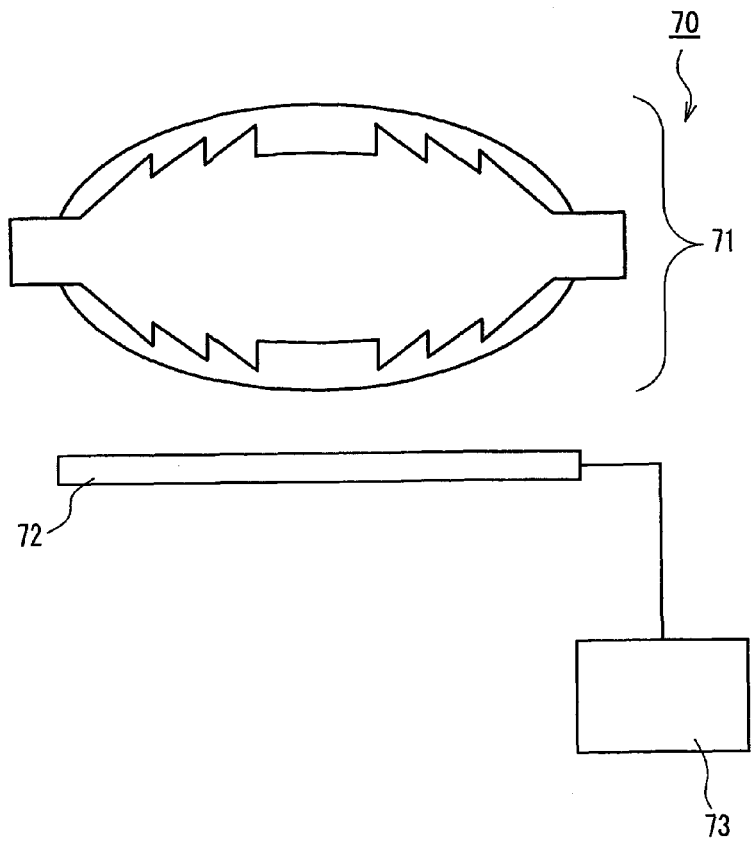
FIG. 9 shows a configuration of an imaging apparatus according to Embodiment 3 of the present invention.

FIG. 9 shows a configuration of an imaging apparatus 70 as an exemplary imaging apparatus of the present invention.

As shown in FIG. 9, the imaging apparatus 70 of the present embodiment includes an optical system 71 having a lens according to one embodiment selected from Embodiments 1 and 2 described above, an imaging element 72, and an arithmetic circuit 73 for forming a subject image based on information detected by the imaging element 72.

In the imaging apparatus 70, light from a subject (not shown) is collected by the optical system 71 and is focused on the imaging element 72. The light thus received is converted into an electric signal in the imaging element 72, and the signal is subjected to processing such as color synthesis and the like by the arithmetic circuit 73. With suitable display means being connected thereto, an image is displayed thereon.

Conventionally, as an imaging element for imaging a color image, an imaging element is known in which color filters of green, red, and blue are arrayed with respect to each pixel in a specific order such as the Bayer array so that a color image is obtained by computation by adjacent pixels.

In order to obtain such a color image, an optical system in which about two or three aspherical lenses are arrayed on an optical axis has been used usually. The reason is as follows: since chromatic aberrations, i.e., deviations of focusing properties owing to wavelengths, cannot be resolved with only one aspherical lens, it is difficult to obtain a color image with high resolution.

On the other hand, the imaging apparatus 70 of the present embodiment employs the optical system 71 composed of one lens that has a diffracting function in addition to a refracting function. Therefore, the imaging apparatus 70 is capable of obtaining a color image having high resolution with only one lens.

Therefore, the imaging apparatus 70 of the present embodiment can be thinned and downsized, while since the number of lenses incorporated in the optical system 71 can be decreased, the process for adjusting and deciding respective positions of the lenses can be simplified. Thus, the imaging apparatus 70 excellent in productivity and economy can be provided. This imaging apparatus 70 is particularly preferable as a camera mounted on a mobile telephone or a vehicle, a camera for monitoring use, or a camera for medical use.

It should be noted that the imaging apparatus 70 composed of one lens is described as the present embodiment, but an imaging apparatus of the present embodiment may have a configuration in which the diffractive optical element of the present invention is incorporated in a part of an optical system composed of a plurality of lenses. This configuration is useful since the number of lenses can be reduced.

Recently, a general diffraction grating pattern is formed on one surface of an imaging lens system composed of a plurality of lenses so that chromatic aberration is reduced. In this case, in order to prevent flare or ghost owing to unnecessary diffracted light from occurring, an excessive increase in the number of diffraction rings is avoided. In the case where a subject having a luminance higher than that of the surrounding environment is to be imaged, flare or ghost can be prevented by incorporating the diffractive optical element of the present invention, which is thus useful.

Further, the present embodiment is described by referring to the imaging apparatus 70 composed of one pair of the lens and the imaging element 72, but an imaging apparatus of the present embodiment may be a compound-eye-type imaging apparatus in which a plurality of such pairs are arranged in parallel. In this case, an arithmetic circuit capable of synthesizing a plurality of images may be used.

The following is a description of examples of the diffractive optical element of the present invention.

Example 1

Example 1 is an example of the lens 10 according to Embodiment 1 described above (see FIG. 1). The substrate is convex on both sides, and the diffraction grating patterns are ring patterns concentric with respect to the optical axis as the center.

Hereinafter, the example is described with reference to FIG. 1. The method for manufacturing the lens of the present example is the same as the method for manufacturing the lens according to Embodiment 2 described above (except that the manufacture of the lens of the present example does not include the step of forming the antireflection films 14a and 14b).

First, a substrate 11 was formed by injection molding, by using, as the first material, a composite material obtained by mixing zinc oxide in a resin containing polycarbonate (produced by Teijin Chemicals, Ltd., trade name: "Panlite AD-5503") as a principal component so that the content of zinc oxide was 30 vol %. In this process, diffraction grating patterns 12a and 12b having a depth of 5.20 μm were formed on both surfaces of the substrate 11, respectively. The composite material had a d-line refractive index of 1.683 and an Abbe's number of 18.9.

Next, by using, as the second material, a composite material obtained by dispersing and mixing zirconium oxide as inorganic particles in a resin containing a cycloolefin-based resin (produced by Zeon Corporation, trade name: "ZEONEX 480R") as a principal component so that the content of zirconium oxide was 50 vol %, coating films 13a and 13b were formed on both surfaces of the substrate 11 so that the coating films 13a and 13b covered the diffraction grating patterns. It should be noted that the foregoing composite material had a d-line refractive index of 1.796, and an Abbe's number of 41.9. When the coating films 13a and 13b were formed, the composite material was applied by spin coating and was cured naturally.

Figure 10:
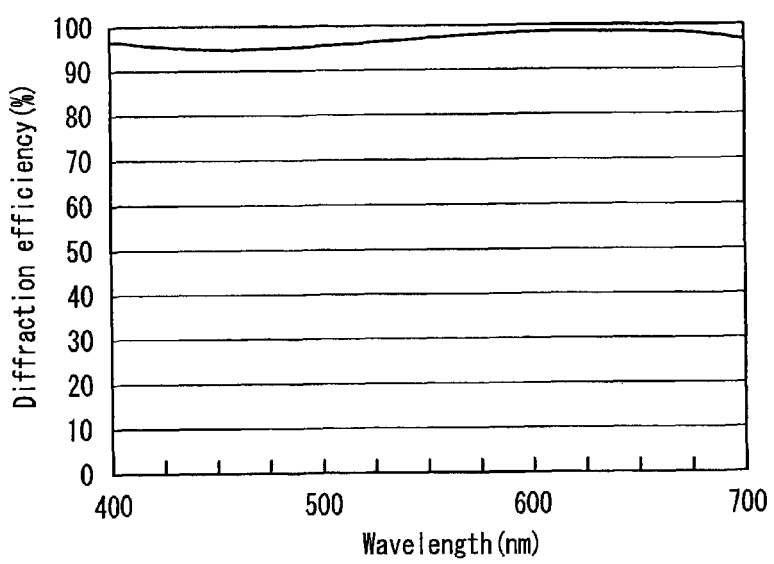
FIG. 10 is a graph showing variation of the first-order diffraction efficiency with wavelength that a diffractive optical element of Example 1 of the present invention exhibited.

FIG. 10 is a graph showing the variation of the first-order diffraction efficiency with wavelength on one surface of the lens of Example 1. In FIG. 10, it can be seen that the diffraction efficiency was not less than 95% in the entire range of visible radiation with wavelengths of not less than 400 nm and not more than 700 nm.

It should be noted that if a lens of the same type is formed by interchanging the material for forming the substrate 11 and the material for forming the coating films 13a and 13b used in the lens of Example 1 with each other, the lens exhibited the same property as that shown in FIG. 10.

Example 2

Example 2 is an example of the lens 20 according to Embodiment 2 described above (see FIG. 2). The substrate is convex on both sides, and the diffraction grating patterns are ring patterns on both surfaces of the substrate.

Hereinafter, the example is described with reference to FIG. 2. The method for manufacturing the lens of the present example is the same as the method for manufacturing the diffractive optical element according to Embodiment 2 described above.

First, a substrate 11 was formed by injection molding, by using, as the first material, a composite material obtained by mixing tantalum oxide in a resin containing polycarbonate (produced by Teijin Chemicals, Ltd., trade name: "Panlite AD-5503") as a principal component so that the content of tantalum oxide was 40 vol %. In this process, diffraction grating patterns 12a and 12b having a depth of 5.71 μm were formed on both surfaces of the substrate 11, respectively. The composite material had a d-line refractive index of 1.809 and an Abbe's number of 17.6.

Next, by using, as the second material, a composite material obtained by dispersing and mixing zirconium oxide as inorganic particles in a resin containing a cycloolefin-based resin (produced by Zeon Corporation, trade name: "ZEONEX 480R") as a principal component so that the content of zirconium oxide was 70 vol %, coating films 13a and 13b were formed by spin coating on both surfaces of the substrate 11 so that the coating films 13a and 13b covered the diffraction grating patterns 12a and 12b, respectively. It should be noted that the foregoing composite material had a d-line refractive index of 1.912, and an Abbe's number of 38.9.

As antireflection films 14a and 14b, antireflection films made of a composite material obtained by dispersing and mixing silicon oxide in an amorphous perfluororesin (produced by Asahi Glass Co., Ltd., trade name: "CYTOP") so that the content of silicon oxide was 38 vol % were used. Here, the composite material had a d-line refractive index of 1.383, which was substantially equal to a square root of the refractive index of 1.912 of the coating films 13a and 13b. The antireflection films 14a and 14b had a thickness of 0.11 μm. The coating of the antireflection films 14a and 14b was performed by spin coating.

Figure 11:
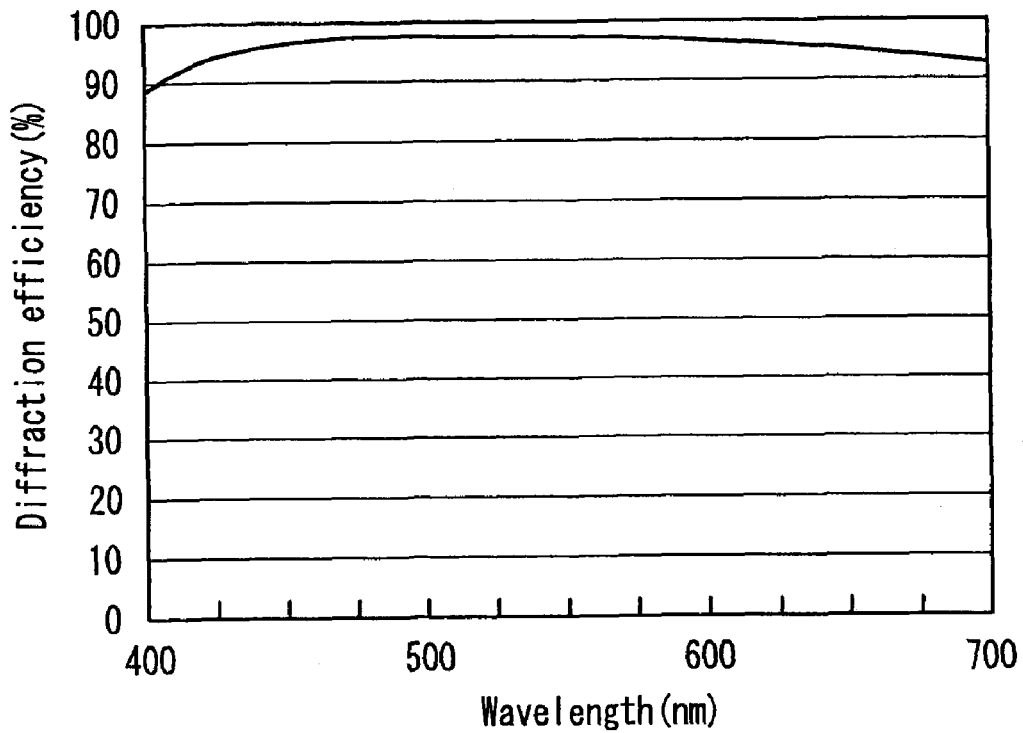
FIG. 11 is a graph showing variation of the first-order diffraction efficiency with wavelength that a diffractive optical element of Example 2 of the present invention exhibited.
Figure 12:
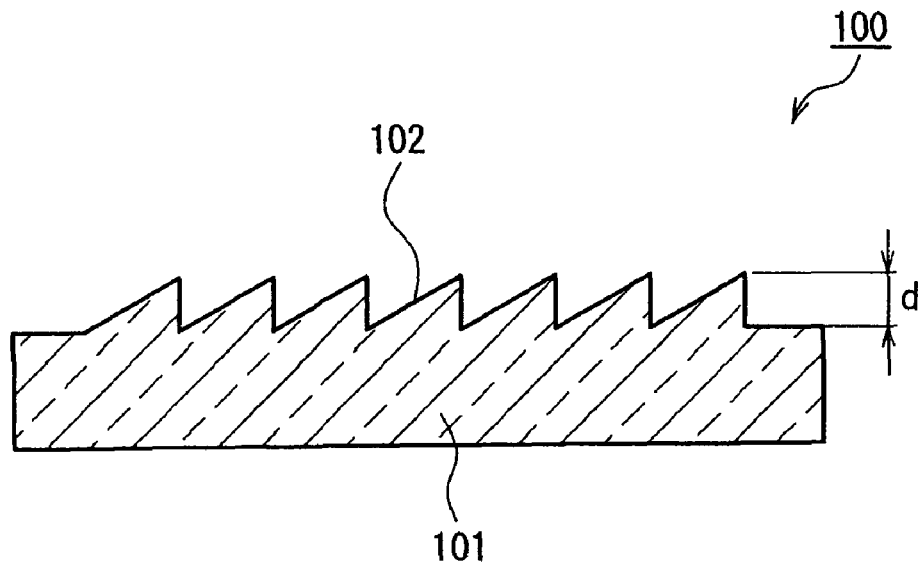
FIG. 12 is a sectional view showing an exemplary conventional diffractive optical element.
Figure 13:
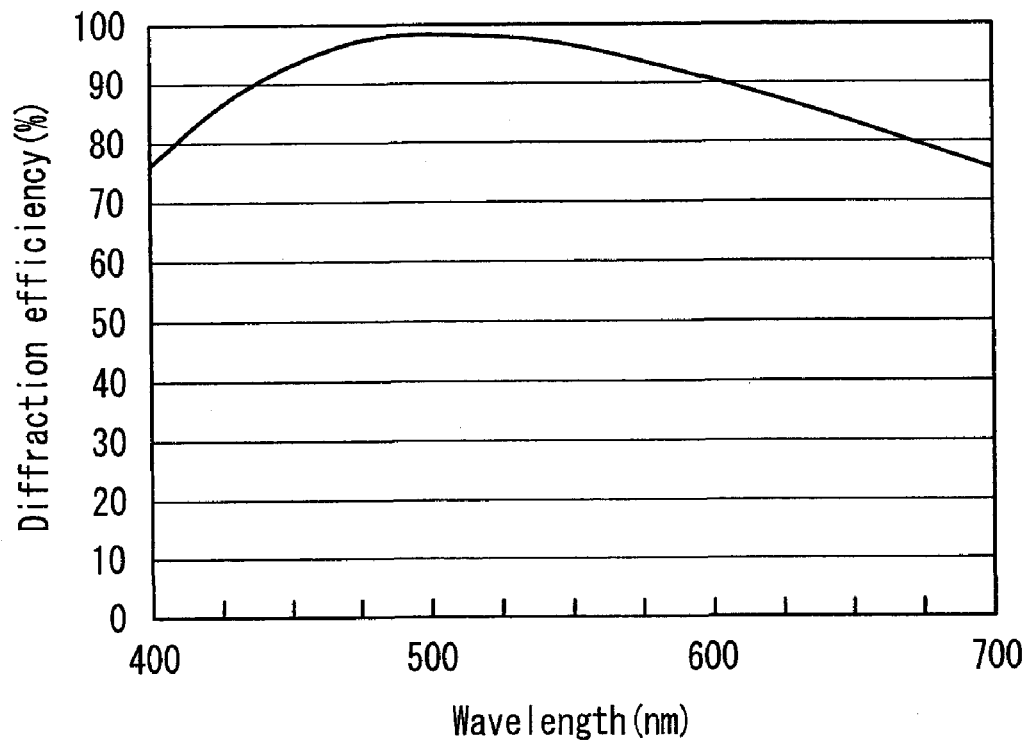
FIG. 13 is a graph showing variation of the first-order diffraction efficiency with wavelength that the diffractive optical element shown in FIG. 12 exhibited.
Figure 14:
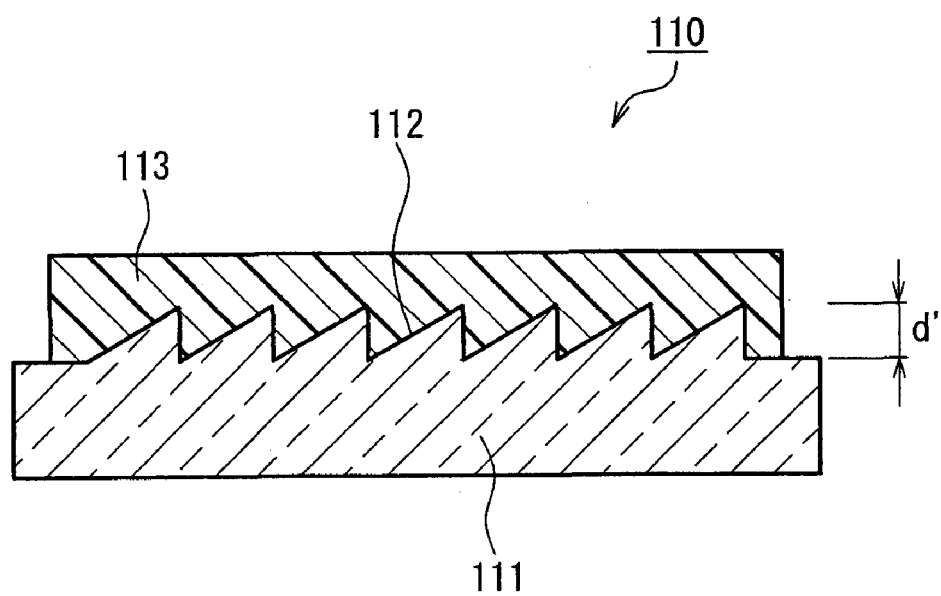
FIG. 14 is a sectional view showing another exemplary conventional diffractive optical element.

FIG. 11 shows wavelength dependence of the first-order diffraction efficiency on one surface of the lens of Example 2. In FIG. 11, it can be seen that the diffraction efficiency was not less than 90% in the entire range of visible radiation with wavelengths of 400 nm to 700 nm. Though not appearing in the property shown in FIG. 11, at interfaces between the coating films 13a, 13b and air, reflection of about 10% on one surface, or about 20% on both surfaces occurred, but such reflection of about 20% on both surfaces was reduced to substantially 0% by the antireflection films 14a and 14b provided thereon. This is because the antireflection films 14a and 14b has an effect of reducing reflection loss.

Example 3

Lenses (No. 1 to No. 37) of the present example were manufactured; materials used and diffraction grating depths of these lenses are shown in Table 1. The lenses of the present example have the same shape as that of the lens of Example 1 described above. Further, the method for manufacturing the lenses of the present example is the same as that of Example 1. It should be noted that the "content by volume" in Table 1 indicates a ratio of inorganic particles in the first material or the second material. "PC1" represents polycarbonate resin (produced by Teijin Chemicals, Ltd., trade name: "Panlite AD-5503"), "COP" represents a cycloolefin-based resin (produced by Zeon Corporation, trade name: "ZEONEX 480R"), "OKP" represents a fluorene-based polyester resin (produced by Osaka Gas Chemicals, Co., Ltd., trade name: "OKP4"), "PC2" represents a polycarbonate-based resin, and "PS" represents a polystyrene-based resin (d-line refractive index: 1.600, Abbe's number: 30).

TABLE 1

| | First material | | | | | Second material | | | |
|---|---|---|---|---|---|---|---|---|---|
| No. | Inorganic particles | Content by volume (%) | Resin | d-line refractive index | Abbe's number | Inorganic particles | Content by volume (%) | Resin | d-line refractive index |
| 1 | $ZrO_2$ | 15 | COP | 1.605 | 50.2 | — | — | PC2 | 1.550 |
| 2 | $ZrO_2$ | 20 | COP | 1.631 | 48.5 | — | — | PC2 | 1.570 |
| 3 | $ZrO_2$ | 20 | COP | 1.631 | 48.5 | — | — | PC2 | 1.570 |
| 4 | $ZrO_2$ | 25 | COP | 1.658 | 47.2 | — | — | PC2 | 1.585 |
| 5 | $ZrO_2$ | 25 | COP | 1.658 | 47.2 | — | — | PC2 | 1.585 |
| 6 | $ZrO_2$ | 25 | COP | 1.658 | 47.2 | — | — | PC2 | 1.540 |
| 7 | $ZrO_2$ | 25 | COP | 1.658 | 47.2 | — | — | PS | 1.600 |
| 8 | $ZrO_2$ | 30 | COP | 1.685 | 45.9 | — | — | OKP | 1.607 |
| 9 | $ZrO_2$ | 30 | COP | 1.685 | 45.9 | — | — | PC1 | 1.585 |
| 10 | $ZrO_2$ | 30 | COP | 1.685 | 45.9 | ZnO | 30 | COP | 1.639 |
| 11 | $ZrO_2$ | 30 | COP | 1.685 | 45.9 | ZnO | 10 | PC1 | 1.617 |
| 12 | $ZrO_2$ | 30 | COP | 1.685 | 45.9 | $Ta_2O_5$ | 10 | PC1 | 1.640 |
| 13 | $ZrO_2$ | 30 | PC1 | 1.730 | 30.7 | ZnO | 20 | PC1 | 1.649 |
| 14 | $ZrO_2$ | 30 | PC1 | 1.730 | 30.7 | ZnO | 30 | PC1 | 1.683 |
| 15 | $ZrO_2$ | 40 | COP | 1.740 | 43.7 | ZnO | 30 | COP | 1.639 |
| 16 | $ZrO_2$ | 40 | COP | 1.740 | 43.7 | ZnO | 40 | COP | 1.678 |
| 17 | $ZrO_2$ | 40 | COP | 1.740 | 43.7 | ZnO | 10 | PC1 | 1.617 |
| 18 | $ZrO_2$ | 40 | COP | 1.740 | 43.7 | ZnO | 20 | PC1 | 1.649 |
| 19 | $ZrO_2$ | 40 | COP | 1.740 | 43.7 | $Ta_2O_5$ | 10 | PC1 | 1.640 |
| 20 | $ZrO_2$ | 40 | PC1 | 1.780 | 31.5 | ZnO | 30 | PC1 | 1.683 |
| 21 | $ZrO_2$ | 40 | PC1 | 1.780 | 31.5 | ZnO | 40 | PC1 | 1.716 |
| 22 | $ZrO_2$ | 40 | PC1 | 1.780 | 31.5 | $TiO_2$ | 20 | PC1 | 1.724 |
| 23 | $ZrO_2$ | 50 | COP | 1.796 | 41.9 | ZnO | 30 | PC1 | 1.683 |
| 24 | $ZrO_2$ | 50 | COP | 1.796 | 41.9 | ZnO | 40 | PC1 | 1.716 |
| 25 | $ZrO_2$ | 50 | COP | 1.796 | 41.9 | $TiO_2$ | 20 | PC1 | 1.724 |
| 26 | $ZrO_2$ | 50 | COP | 1.796 | 41.9 | $Ta_2O_5$ | 20 | PC1 | 1.695 |
| 27 | $ZrO_2$ | 50 | PC1 | 1.830 | 32.3 | ZnO | 50 | PC1 | 1.749 |
| 28 | $ZrO_2$ | 50 | PC1 | 1.830 | 32.3 | $TiO_2$ | 25 | PC1 | 1.758 |
| 29 | $ZrO_2$ | 55 | COP | 1.825 | 41.1 | $Ta_2O_5$ | 40 | COP | 1.769 |
| 30 | $ZrO_2$ | 60 | COP | 1.853 | 40.3 | ZnO | 40 | PC1 | 1.716 |
| 31 | $ZrO_2$ | 60 | COP | 1.853 | 40.3 | ZnO | 50 | PC1 | 1.749 |
| 32 | $ZrO_2$ | 60 | COP | 1.853 | 40.3 | $Ta_2O_5$ | 30 | PC1 | 1.752 |
| 33 | $ZrO_2$ | 60 | PC1 | 1.881 | 33.0 | ZnO | 50 | COP | 1.717 |
| 34 | $ZrO_2$ | 65 | PC1 | 1.905 | 33.3 | $TiO_2$ | 40 | COP | 1.825 |
| 35 | $ZrO_2$ | 70 | COP | 1.912 | 38.9 | $Ta_2O_5$ | 40 | PC1 | 1.809 |
| 36 | $ZrO_2$ | 80 | COP | 1.972 | 37.6 | $Ta_2O_5$ | 40 | PC1 | 1.809 |
| 37 | $ZrO_2$ | 85 | PC1 | 2.017 | 34.5 | $TiO_2$ | 50 | COP | 1.906 |

| | Second material | Diffraction | 1st-order diffraction efficiency (%) | | | |
|---|---|---|---|---|---|---|
| No. | Abbe's number | grating depth (µm) | Wavelength 400 nm | Wavelength 500 nm | Wavelength 600 nm | Wavelength 700 nm |
| 1 | 28.0 | 10.70 | 95.6 | 97.7 | 100 | 96.2 |
| 2 | 24.0 | 9.50 | 100 | 99.4 | 99.8 | 96.3 |
| 3 | 30.0 | 9.10 | 93.0 | 99.3 | 98.4 | 90.6 |
| 4 | 20.0 | 8.00 | 98.0 | 99.8 | 99.9 | 97.5 |
| 5 | 33.0 | 7.30 | 86.2 | 99.6 | 96.2 | 84.9 |
| 6 | 22.0 | 4.70 | 91.1 | 99.1 | 98.4 | 90.2 |
| 7 | 30.0 | 9.80 | 91.8 | 98.5 | 99.3 | 92.8 |
| 8 | 27.0 | 7.20 | 91.3 | 98.8 | 98.9 | 91.6 |
| 9 | 27.9 | 5.88 | 88.4 | 98.5 | 95.0 | 84.5 |
| 10 | 23.4 | 12.78 | 82.3 | 98.7 | 98.7 | 97.7 |
| 11 | 23.8 | 8.65 | 98.6 | 98.0 | 98.6 | 95.0 |
| 12 | 23.7 | 13.07 | 85.6 | 98.0 | 97.6 | 98.7 |

TABLE 1-continued

| | | | | | |
|---|---|---|---|---|---|
| 13 | 20.9 | 7.26 | 80.6 | 92.6 | 98.7 | 95.7 |
| 14 | 18.9 | 12.51 | 83.9 | 98.7 | 98.6 | 98.4 |
| 15 | 23.4 | 5.82 | 95.6 | 98.7 | 95.8 | 87.1 |
| 16 | 20.2 | 9.48 | 84.6 | 98.7 | 98.7 | 98.0 |
| 17 | 23.8 | 4.78 | 93.2 | 98.7 | 94.1 | 83.5 |
| 18 | 20.9 | 6.53 | 98.7 | 98.2 | 98.4 | 94.6 |
| 19 | 23.7 | 5.88 | 96.4 | 98.7 | 95.2 | 86.2 |
| 20 | 18.9 | 6.06 | 87.3 | 91.9 | 98.1 | 97.5 |
| 21 | 17.3 | 9.19 | 88.8 | 98.2 | 98.2 | 98.6 |
| 22 | 18.8 | 10.50 | 85.0 | 98.7 | 98.7 | 98.1 |
| 23 | 18.9 | 5.20 | 97.0 | 96.1 | 98.7 | 96.9 |
| 24 | 17.3 | 7.26 | 82.7 | 98.7 | 98.5 | 98.5 |
| 25 | 18.8 | 8.17 | 81.0 | 98.5 | 98.1 | 98.7 |
| 26 | 21.0 | 5.82 | 98.5 | 98.7 | 95.9 | 88.3 |
| 27 | 16.0 | 7.26 | 89.5 | 98.4 | 98.5 | 98.3 |
| 28 | 17.7 | 8.17 | 90.5 | 98.1 | 98.2 | 98.6 |
| 29 | 20.5 | 10.50 | 62.5 | 98.4 | 98.6 | 98.6 |
| 30 | 17.3 | 4.26 | 96.5 | 96.9 | 98.7 | 95.4 |
| 31 | 16.0 | 5.65 | 85.2 | 98.0 | 97.5 | 94.1 |
| 32 | 19.0 | 5.82 | 96.6 | 98.3 | 96.1 | 89.9 |
| 33 | 17.9 | 4.32 | 97.6 | 97.6 | 98.5 | 94.6 |
| 34 | 17.2 | 7.35 | 86.6 | 98.7 | 98.7 | 98.0 |
| 35 | 17.6 | 5.71 | 88.8 | 98.0 | 97.1 | 93.0 |
| 36 | 17.6 | 3.61 | 98.7 | 98.3 | 93.9 | 85.1 |
| 37 | 15.3 | 5.30 | 82.3 | 98.7 | 98.7 | 97.9 |

Here, a composite material containing zirconium oxide as inorganic particles was used as the first material, and a composite material or a resin was used as the second material.

Next, the first-order diffraction efficiencies of the lenses of the present example were measured by a recording spectrophotometer (manufactured by Hitachi, Ltd., U3410 model) at wavelengths of 400 nm, 500 nm, 600 nm, and 700 nm. The results are shown in Table 1.

It is clear from Table 1 that every lens according to Example 3 exhibited first-order diffraction efficiencies of more than 80% in all the cases with respect to 400 nm, 500 nm, 600 nm, and 700 nm. Besides, though not shown in Table 1, the first-order diffraction efficiency exceeded 80% in an entirety of a wavelength band of 400 nm to 700 nm. Every lens according to Example 3 had a diffraction grating depth of not more than 15 μm, and hence, it had diffraction grating patterns that can be manufactured readily and had small grating pitches.

Thus, by using, as the first material, a composite material containing zirconium oxide as inorganic particles, the wavelength dependence of the diffraction efficiency was reduced.

Example 4

Lenses (No. 1 to No. 37) of the present example were manufactured; materials used and diffraction grating depths of these lenses are shown in Table 2. The lenses of the present example are different from the lenses of Example 3 only in that regarding the diffraction grating pattern, the first material and the second material were inverted. The first-order diffraction efficiencies of the lenses of the present example were measured in the same manner as that for Example 1. The results are shown in Table 2.

TABLE 2

| | First material | | | | | Second material | | | |
|---|---|---|---|---|---|---|---|---|---|
| No. | Inorganic particles | Content by volume (%) | Resin | d-line refractive index | Abbe's number | Inorganic particles | Content by volume (%) | Resin | d-line refractive index |
| 1 | — | — | PC2 | 1.550 | 28.0 | ZrO$_2$ | 15 | COP | 1.605 |
| 2 | — | — | PC2 | 1.570 | 24.0 | ZrO$_2$ | 20 | COP | 1.631 |
| 3 | — | — | PC2 | 1.570 | 30.0 | ZrO$_2$ | 20 | COP | 1.631 |
| 4 | — | — | PC2 | 1.585 | 20.0 | ZrO$_2$ | 25 | COP | 1.658 |
| 5 | — | — | PC2 | 1.585 | 33.0 | ZrO$_2$ | 25 | COP | 1.658 |
| 6 | — | — | PC2 | 1.540 | 22.0 | ZrO$_2$ | 25 | COP | 1.658 |
| 7 | — | — | PS | 1.600 | 30.0 | ZrO$_2$ | 25 | COP | 1.658 |
| 8 | — | — | OKP | 1.607 | 27.0 | ZrO$_2$ | 30 | COP | 1.685 |
| 9 | — | — | PC1 | 1.585 | 27.9 | ZrO$_2$ | 30 | COP | 1.685 |
| 10 | ZnO | 30 | COP | 1.639 | 23.4 | ZrO$_2$ | 30 | COP | 1.685 |
| 11 | ZnO | 10 | PC1 | 1.617 | 23.8 | ZrO$_2$ | 30 | COP | 1.685 |
| 12 | Ta$_2$O$_5$ | 10 | PC1 | 1.640 | 23.7 | ZrO$_2$ | 30 | COP | 1.685 |
| 13 | ZnO | 20 | PC1 | 1.649 | 20.9 | ZrO$_2$ | 30 | PC1 | 1.730 |
| 14 | ZnO | 30 | PC1 | 1.683 | 18.9 | ZrO$_2$ | 30 | PC1 | 1.730 |
| 15 | ZnO | 30 | COP | 1.639 | 23.4 | ZrO$_2$ | 40 | COP | 1.740 |
| 16 | ZnO | 40 | COP | 1.678 | 20.2 | ZrO$_2$ | 40 | COP | 1.740 |
| 17 | ZnO | 10 | PC1 | 1.617 | 23.8 | ZrO$_2$ | 40 | COP | 1.740 |
| 18 | ZnO | 20 | PC1 | 1.649 | 20.9 | ZrO$_2$ | 40 | COP | 1.740 |

TABLE 2-continued

| | | | | | | | | | |
|---|---|---|---|---|---|---|---|---|---|
| 19 | $Ta_2O_5$ | 10 | PC1 | 1.640 | 23.7 | $ZrO_2$ | 40 | COP | 1.740 |
| 20 | ZnO | 30 | PC1 | 1.683 | 18.9 | $ZrO_2$ | 40 | PC1 | 1.780 |
| 21 | ZnO | 40 | PC1 | 1.716 | 17.3 | $ZrO_2$ | 40 | PC1 | 1.780 |
| 22 | $TiO_2$ | 20 | PC1 | 1.724 | 18.8 | $ZrO_2$ | 40 | PC1 | 1.780 |
| 23 | ZnO | 30 | PC1 | 1.683 | 18.9 | $ZrO_2$ | 50 | COP | 1.796 |
| 24 | ZnO | 40 | PC1 | 1.716 | 17.3 | $ZrO_2$ | 50 | COP | 1.796 |
| 25 | $TiO_2$ | 20 | PC1 | 1.724 | 18.8 | $ZrO_2$ | 50 | COP | 1.796 |
| 26 | $Ta_2O_5$ | 20 | PC1 | 1.695 | 21.0 | $ZrO_2$ | 50 | COP | 1.796 |
| 27 | ZnO | 50 | PC1 | 1.749 | 16.0 | $ZrO_2$ | 50 | PC1 | 1.830 |
| 28 | $TiO_2$ | 25 | PC1 | 1.758 | 17.7 | $ZrO_2$ | 50 | PC1 | 1.830 |
| 29 | $Ta_2O_5$ | 40 | COP | 1.769 | 20.5 | $ZrO_2$ | 55 | COP | 1.825 |
| 30 | ZnO | 40 | PC1 | 1.716 | 17.3 | $ZrO_2$ | 60 | COP | 1.853 |
| 31 | ZnO | 50 | PC1 | 1.749 | 16.0 | $ZrO_2$ | 60 | COP | 1.853 |
| 32 | $Ta_2O_5$ | 30 | PC1 | 1.752 | 19.0 | $ZrO_2$ | 60 | COP | 1.853 |
| 33 | ZnO | 50 | COP | 1.717 | 17.9 | $ZrO_2$ | 60 | PC1 | 1.881 |
| 34 | $TiO_2$ | 40 | COP | 1.825 | 17.2 | $ZrO_2$ | 65 | PC1 | 1.905 |
| 35 | $Ta_2O_5$ | 40 | PC1 | 1.809 | 17.6 | $ZrO_2$ | 70 | COP | 1.912 |
| 36 | $Ta_2O_5$ | 40 | PC1 | 1.809 | 17.6 | $ZrO_2$ | 80 | COP | 1.972 |
| 37 | $TiO_2$ | 50 | COP | 1.906 | 15.3 | $ZrO_2$ | 85 | PC1 | 2.017 |

| | Second material | Diffraction | 1st-order diffraction efficiency (%) | | | |
|---|---|---|---|---|---|---|
| No. | Abbe's number | grating depth (μm) | Wavelength 400 nm | Wavelength 500 nm | Wavelength 600 nm | Wavelength 700 nm |
| 1 | 50.2 | 10.70 | 95.6 | 97.7 | 100 | 96.2 |
| 2 | 48.5 | 9.50 | 100 | 99.4 | 99.8 | 96.3 |
| 3 | 48.5 | 9.10 | 93.0 | 99.3 | 98.4 | 90.6 |
| 4 | 47.2 | 8.00 | 98.0 | 99.8 | 99.9 | 97.5 |
| 5 | 47.2 | 7.30 | 86.2 | 99.6 | 96.2 | 84.9 |
| 6 | 47.2 | 4.70 | 91.1 | 99.1 | 98.4 | 90.2 |
| 7 | 47.2 | 9.80 | 91.8 | 98.5 | 99.3 | 92.8 |
| 8 | 45.9 | 7.20 | 91.3 | 98.8 | 98.9 | 91.6 |
| 9 | 45.9 | 5.88 | 88.4 | 98.5 | 95.0 | 84.5 |
| 10 | 45.9 | 12.78 | 82.3 | 98.7 | 98.7 | 97.7 |
| 11 | 45.9 | 8.65 | 98.6 | 98.0 | 98.6 | 95.0 |
| 12 | 45.9 | 13.07 | 85.6 | 98.0 | 97.6 | 98.7 |
| 13 | 30.7 | 7.26 | 80.6 | 92.6 | 98.7 | 95.7 |
| 14 | 30.7 | 12.51 | 83.9 | 98.7 | 98.6 | 98.4 |
| 15 | 43.7 | 5.82 | 95.6 | 98.7 | 95.8 | 87.1 |
| 16 | 43.7 | 9.48 | 84.6 | 98.7 | 98.7 | 98.0 |
| 17 | 43.7 | 4.78 | 93.2 | 98.7 | 94.1 | 83.5 |
| 18 | 43.7 | 6.53 | 98.7 | 98.2 | 98.4 | 94.6 |
| 19 | 43.7 | 5.88 | 96.4 | 98.7 | 95.2 | 86.2 |
| 20 | 31.5 | 6.06 | 87.3 | 91.9 | 98.1 | 97.5 |
| 21 | 31.5 | 9.19 | 88.8 | 98.2 | 98.2 | 98.6 |
| 22 | 31.5 | 10.50 | 85.0 | 98.7 | 98.7 | 98.1 |
| 23 | 41.9 | 5.20 | 97.0 | 96.1 | 98.7 | 96.9 |
| 24 | 41.9 | 7.26 | 82.7 | 98.7 | 98.5 | 98.5 |
| 25 | 41.9 | 8.17 | 81.0 | 98.5 | 98.1 | 98.7 |
| 26 | 41.9 | 5.82 | 98.5 | 98.7 | 95.9 | 88.3 |
| 27 | 32.3 | 7.26 | 89.5 | 98.4 | 98.5 | 98.3 |
| 28 | 32.3 | 8.17 | 90.5 | 98.1 | 98.2 | 98.6 |
| 29 | 41.1 | 10.50 | 62.5 | 98.4 | 98.6 | 98.6 |
| 30 | 40.3 | 4.26 | 96.5 | 96.9 | 98.7 | 95.4 |
| 31 | 40.3 | 5.65 | 85.2 | 98.0 | 97.5 | 94.1 |
| 32 | 40.3 | 5.82 | 96.6 | 98.3 | 96.1 | 89.9 |
| 33 | 33.0 | 4.32 | 97.6 | 97.6 | 98.5 | 94.6 |
| 34 | 33.3 | 7.35 | 86.6 | 98.7 | 98.7 | 98.0 |
| 35 | 38.9 | 5.71 | 88.8 | 98.0 | 97.1 | 93.0 |
| 36 | 37.6 | 3.61 | 98.7 | 98.3 | 93.9 | 85.1 |
| 37 | 34.5 | 5.30 | 82.3 | 98.7 | 98.7 | 97.9 |

It is clear from Table 2 that every lens according to Example 4 exhibited first-order diffraction efficiencies of more than 80% in all the cases with respect to 400 nm, 500 nm, 600 nm, and 700 nm. Besides, though not shown in Table 2, the first-order diffraction efficiency exceeded 80% in an entirety of a wavelength band of 400 nm to 700 nm. Every lens according to Example 4 had a diffraction grating depth of not more than 15 μm, and hence, it had diffraction grating patterns that can be manufactured readily and had small grating pitches. Thus, by using, as the second material, a composite material containing zirconium oxide as inorganic particles, the wavelength dependence of the diffraction efficiency was reduced.

Example 5

Lenses (No. 1 to No. 7) of the present example were manufactured; materials used and diffraction grating depths of these lenses are shown in Table 3. The lenses of the present example had the same shape as that of Example 3 described above, and the method for manufacturing these lenses was the same as the manufacturing method of Example 1. The first-order diffraction efficiencies of the lenses of the present example were measured in the same manner as that for Example 1. The results are shown in Table 3.

It is clear from Table 3 that every lens according to Example 5 exhibited first-order diffraction efficiencies of more than 80% in all the cases with respect to 400 nm, 500 nm, 600 nm, and 700 nm. Besides, though not shown in Table 3, the first-order diffraction efficiency exceeded 80% in an entirety of a wavelength band of 400 nm to 700 nm. Every lens according to Example 5 had a diffraction grating depth of not more than 15 μm, and hence, it had diffraction grating patterns that can be manufactured readily and had small grating pitches. Thus, by using zinc oxide as inorganic particles contained in the first material, the wavelength dependence of the diffraction efficiency was reduced.

Example 6

Lenses (No. 1 to No. 7) of the present example were manufactured; materials used and diffraction grating depths of these lenses are shown in Table 4. The lenses of the present example are different from the lenses of Example 5 only in that regarding the diffraction grating pattern, the first material and the second material were inverted. The first-order diffraction efficiencies of the lenses of the present example were measured in the same manner as that for Example 1. The results are shown in Table 4.

TABLE 3

| | First material | | | | | Second material | | | |
|---|---|---|---|---|---|---|---|---|---|
| No. | Inorganic particles | Content by volume (%) | Resin | d-line refractive index | Abbe's number | Inorganic particles | Content by volume (%) | Resin | d-line refractive index |
| 1 | ZnO | 10 | PC1 | 1.617 | 23.8 | $Al_2O_3$ | 40 | PC1 | 1.657 |
| 2 | ZnO | 10 | PC1 | 1.617 | 23.8 | $Al_2O_3$ | 50 | PC1 | 1.675 |
| 3 | ZnO | 20 | PC1 | 1.650 | 20.9 | $Y_2O_3$ | 50 | PC1 | 1.753 |
| 4 | ZnO | 20 | PC1 | 1.650 | 20.9 | $Y_2O_3$ | 40 | PC1 | 1.719 |
| 5 | ZnO | 30 | PC1 | 1.683 | 18.9 | $Y_2O_3$ | 50 | PC1 | 1.753 |
| 6 | ZnO | 40 | COP | 1.678 | 20.2 | $Y_2O_3$ | 55 | COP | 1.740 |
| 7 | ZnO | 40 | COP | 1.678 | 20.2 | $Y_2O_3$ | 40 | PC1 | 1.719 |

| | Second material | Diffraction | 1st-order diffraction efficiency (%) | | | |
|---|---|---|---|---|---|---|
| No. | Abbe's number | grating depth (μm) | Wavelength 400 nm | Wavelength 500 nm | Wavelength 600 nm | Wavelength 700 nm |
| 1 | 39.2 | 14.70 | 90.6 | 98.6 | 98.7 | 97.9 |
| 2 | 43.1 | 10.14 | 98.5 | 95.5 | 98.1 | 98.2 |
| 3 | 31.5 | 5.71 | 88.6 | 98.0 | 96.7 | 87.9 |
| 4 | 30.8 | 8.52 | 91.4 | 95.9 | 98.7 | 94.7 |
| 5 | 31.5 | 8.40 | 98.6 | 97.6 | 98.7 | 97.1 |
| 6 | 40.2 | 9.48 | 90.6 | 98.6 | 98.7 | 97.7 |
| 7 | 30.8 | 14.34 | 94.1 | 97.8 | 98.3 | 98.4 |

TABLE 4

| No. | First material | | | | | Second material | | | |
| --- | --- | --- | --- | --- | --- | --- | --- | --- | --- |
| | Inorganic particles | Content by volume (%) | Resin | d-line refractive index | Abbe's number | Inorganic particles | Content by volume (%) | Resin | d-line refractive index |
| 1 | Al$_2$O$_3$ | 40 | PC1 | 1.657 | 39.2 | ZnO | 10 | PC1 | 1.617 |
| 2 | Al$_2$O$_3$ | 50 | PC1 | 1.675 | 43.1 | ZnO | 10 | PC1 | 1.617 |
| 3 | Y$_2$O$_3$ | 50 | PC1 | 1.753 | 31.5 | ZnO | 20 | PC1 | 1.650 |
| 4 | Y$_2$O$_3$ | 40 | PC1 | 1.719 | 30.8 | ZnO | 20 | PC1 | 1.650 |
| 5 | Y$_2$O$_3$ | 50 | PC1 | 1.753 | 31.5 | ZnO | 30 | PC1 | 1.683 |
| 6 | Y$_2$O$_3$ | 55 | COP | 1.740 | 40.2 | ZnO | 40 | COP | 1.678 |
| 7 | Y$_2$O$_3$ | 40 | PC1 | 1.719 | 30.8 | ZnO | 40 | COP | 1.678 |

| No. | Second material Abbe's number | Diffraction grating depth (μm) | 1st-order diffraction efficiency (%) | | | |
| --- | --- | --- | --- | --- | --- | --- |
| | | | Wavelength 400 nm | Wavelength 500 nm | Wavelength 600 nm | Wavelength 700 nm |
| 1 | 23.8 | 14.70 | 90.6 | 98.6 | 98.7 | 97.9 |
| 2 | 23.8 | 10.14 | 98.5 | 95.5 | 98.1 | 98.2 |
| 3 | 20.9 | 5.71 | 88.6 | 98.0 | 96.7 | 87.9 |
| 4 | 20.9 | 8.52 | 91.4 | 95.9 | 98.7 | 94.7 |
| 5 | 18.9 | 8.40 | 98.6 | 97.6 | 98.7 | 97.1 |
| 6 | 20.2 | 9.48 | 90.6 | 98.6 | 98.7 | 97.7 |
| 7 | 20.2 | 14.34 | 94.1 | 97.8 | 98.3 | 98.4 |

It is clear from Table 4 that every lens according to Example 6 exhibited first-order diffraction efficiencies of more than 80% in all the cases with respect to 400 nm, 500 nm, 600 nm, and 700 nm. Besides, though not shown in Table 4, the first-order diffraction efficiency exceeded 80% in an entirety of a wavelength band of 400 nm to 700 nm. Every lens according to Example 6 had a diffraction grating depth of not more than 15 μm, and hence, it had diffraction grating patterns that can be manufactured readily and had small grating pitches. Thus, by using, as the second material, a composite material containing zinc oxide as inorganic particles, the wavelength dependence of the diffraction efficiency was reduced.

Example 7

A lens (No. 1) of the present example was manufactured; materials used and a diffraction grating depth of this lens are shown in Table 5. The lens of the present example had the same shape as that of the lenses according to Example 3 described above, and the method for manufacturing the lens of the present example was the same as the manufacturing method of Example 1. The first-order diffraction efficiency of the lens of the present example was measured in the same manner as that for Example 1. The results are shown in Table 5.

TABLE 5

| No. | First material | | | | | Second material | | | |
| --- | --- | --- | --- | --- | --- | --- | --- | --- | --- |
| | Inorganic particles | Content by volume (%) | Resin | d-line refractive index | Abbe's number | Inorganic particles | Content by volume (%) | Resin | d-line refractive index |
| 1 | — | — | PC1 | 1.585 | 27.9 | Al$_2$O$_3$ | 50 | COP | 1.644 |

| No. | Second material Abbe's number | Diffraction grating depth (μm) | 1st-order diffraction efficiency (%) | | | |
| --- | --- | --- | --- | --- | --- | --- |
| | | | Wavelength 400 nm | Wavelength 500 nm | Wavelength 600 nm | Wavelength 700 nm |
| 1 | 66.8 | 9.97 | 96.4 | 98.7 | 98.1 | 94.3 |

It is clear from Table 5 that the lens according to Example 7 exhibited first-order diffraction efficiencies of more than 90% in all the cases with respect to 400 nm, 500 nm, 600 nm, and 700 nm. Besides, though not shown in Table 5, the first-order diffraction efficiency exceeded 90% in an entirety of a wavelength band of 400 nm to 700 nm. The lens according to Example 7 had a diffraction grating depth of not more than 10 μm, and hence, it had diffraction grating patterns that can be manufactured readily and had small grating pitches. Thus, by using, as the second material, a composite material containing aluminum oxide as inorganic particles, the wavelength dependence of the diffraction efficiency was reduced.

Example 8

A lens (No. 1) of the present example was manufactured; materials used and a diffraction grating depth of this lens are shown in Table 6. The lens of the present example is different from the lens of Example 7 only in that regarding the diffraction grating pattern, the first material and the second material were inverted. The first-order diffraction efficiencies of the lens of the present example were measured in the same manner as that for Example 1. The results are shown in Table 6.

TABLE 6

| No. | First material | | | | | Second material | | | |
| --- | --- | --- | --- | --- | --- | --- | --- | --- | --- |
| | Inorganic particles | Content by volume (%) | Resin | d-line refractive index | Abbe's number | Inorganic particles | Content by volume (%) | Resin | d-line refractive index |
| 1 | Al$_2$O$_3$ | 50 | COP | 1.644 | 66.8 | — | — | PC1 | 1.585 |

| No. | Second material Abbe's number | Diffraction grating depth (μm) | 1st-order diffraction efficiency (%) | | | |
| --- | --- | --- | --- | --- | --- | --- |
| | | | Wavelength 400 nm | Wavelength 500 nm | Wavelength 600 nm | Wavelength 700 nm |
| 1 | 27.9 | 9.97 | 96.4 | 98.7 | 98.1 | 94.3 |

It is clear from Table 6 that the lens according to Example 8 exhibited first-order diffraction efficiencies of more than 90% in all the cases with respect to 400 nm, 500 nm, 600 nm, and 700 nm. Besides, though not shown in Table 6, the first-order diffraction efficiency exceeded 90% in an entirety of a wavelength band of 400 nm to 700 nm. The lens according to Example 8 had a diffraction grating depth of not more than 10 μm, and hence, it had diffraction grating patterns that can be manufactured readily and had small grating pitches. Thus, by using, as the first material, a composite material containing aluminum oxide as inorganic particles, the wavelength dependence of the diffraction efficiency was reduced.

Example 9

Lenses (No. 1 to No. 3) of the present example were manufactured; materials used and diffraction grating depths of these lenses are shown in Table 7. The lenses of the present example had the same shape as those of Example 3, and the method for manufacturing these lenses was the same as the manufacturing method of Example 1. The first-order diffraction efficiencies of the lenses of the present example were measured in the same manner as that for Example 1. The results are shown in Table 7.

It is clear from Table 7 that the lens No. 1 exhibited first-order diffraction efficiencies of more than 95% in all the cases with respect to 500 nm, 600 nm, and 700 nm, but the first-order diffraction efficiency thereof with respect to a wavelength of 400 nm abruptly decreased to 32.9%. Thus, an appropriate diffraction efficiency was not maintained through an entirety of the visible radiation range. Besides, the lens No. 1 had a diffraction grating depth of 21 μm. On the other hand, the lenses No. 2 and No. 3 exhibited first-order diffraction efficiencies of more than 95% in all cases with respect to 400 nm, 500 nm, 600 nm, and 700 nm. The lenses No. 2 and No. 3 had diffraction grating depths of not more than 15 μm, and hence, each of them had diffraction grating patterns that can be manufactured readily and had small grating pitches.

Example 10

Lenses (No. 1 to No. 3) of the present example were manufactured; materials used and diffraction grating depths of these lenses are shown in Table 8. The lenses of the present example are different from the lenses of Example 9 only in that regarding the diffraction grating pattern, the first material and the second material were inverted. The first-order diffrac-

TABLE 7

| No. | First material | | | | | Second material | | | |
| --- | --- | --- | --- | --- | --- | --- | --- | --- | --- |
| | Inorganic particles | Content by volume (%) | Resin | d-line refractive index | Abbe's number | Inorganic particles | Content by volume (%) | Resin | d-line refractive index |
| 1 | TiO$_2$ | 20 | COP | 1.672 | 24.3 | Y$_2$O$_3$ | 45 | COP | 1.700 |
| 2 | TiO$_2$ | 20 | COP | 1.672 | 24.3 | Y$_2$O$_3$ | 22.5 | COP | 1.720 |
| 3 | TiO$_2$ | 20 | COP | 1.672 | 24.3 | ZrO$_2$ | 20 | COP | 1.720 |

| No. | Second material Abbe's number | Diffraction grating depth (μm) | 1st-order diffraction efficiency (%) | | | |
| --- | --- | --- | --- | --- | --- | --- |
| | | | Wavelength 400 nm | Wavelength 500 nm | Wavelength 600 nm | Wavelength 700 nm |
| 1 | 42.0 | 21.00 | 32.9 | 98.2 | 97.1 | 97.6 |
| 2 | 42.4 | 12.26 | 97.0 | 97.2 | 98.2 | 98.4 |
| 3 | 42.4 | 12.26 | 97.0 | 97.2 | 98.2 | 98.4 | tion efficiencies of the lenses of the present example were measured in the same manner as that for Example 1. The results are shown in Table 8.

TABLE 8

| | First material | | | | Second material | | | |
|---|---|---|---|---|---|---|---|---|
| No. | Inorganic particles | Content by volume (%) | Resin | d-line refractive index | Abbe's number | Inorganic particles | Content by volume (%) | Resin | d-line refractive index |
| 1 | $Y_2O_3$ | 45 | COP | 1.700 | 42.0 | $TiO_2$ | 20 | COP | 1.672 |
| 2 | $Y_2O_3$ | 22.5 | COP | 1.720 | 42.4 | $TiO_2$ | 20 | COP | 1.672 |
| 3 | $ZrO_2$ | 20 | COP | 1.720 | 42.4 | $TiO_2$ | 20 | COP | 1.672 |

| | Second material | Diffraction | 1st-order diffraction efficiency (%) | | | |
|---|---|---|---|---|---|---|
| No. | Abbe's number | grating depth (μm) | Wavelength 400 nm | Wavelength 500 nm | Wavelength 600 nm | Wavelength 700 nm |
| 1 | 24.3 | 21.00 | 32.9 | 98.2 | 97.1 | 97.6 |
| 2 | 24.3 | 12.26 | 97.0 | 97.2 | 98.2 | 98.4 |
| 3 | 24.3 | 12.26 | 97.0 | 97.2 | 98.2 | 98.4 |

It is clear from Table 8 that the lens No. 1 exhibited first-order diffraction efficiencies of more than 95% in all the cases with respect to 500 nm, 600 nm, and 700 nm, but the first-order diffraction efficiency thereof with respect to a wavelength of 400 nm abruptly decreased to 32.9%. Thus, an appropriate diffraction efficiency was not maintained through an entirety of the visible radiation range. Besides, the lens No. 1 had a diffraction grating depth of 21 μm. On the other hand, the lenses No. 2 and No. 3 exhibited first-order diffraction efficiencies of more than 95% in all cases with respect to 400 nm, 500 nm, 600 nm, and 700 nm. The lenses No. 2 and No. 3 had diffraction grating depths of not more than 15 μm, and hence, each of them had diffraction grating patterns that can be manufactured readily and had small grating pitches.

It should be noted that in the case where the substrate is made of a composite material, if the content by volume of inorganic particles is not more than 50 vol %, the molding of the diffraction grating pattern is facilitated.

In the lenses of Examples 3 to 10, if the first and second materials used for forming the substrate and the coating films, respectively, are inverted so that the second material was used for forming the substrate and the first material was used for forming the coating films, the same wavelength dependence of the diffraction efficiency was exhibited.

INDUSTRIAL APPLICABILITY

According to the configuration of the diffractive optical element of the present invention, the moldability can be improved, and the generation of unnecessary light can be suppressed in a wide wavelength range. Thus, the diffractive optical element of the present invention can be designed so as to have decreased wavelength dependence of the diffraction efficiency. Besides, the diffractive optical element of the present invention can be manufactured readily. Thus, the present invention makes it possible to provide a diffractive optical element particularly suitable for an optical system for imaging, such as a camera. This diffractive optical element is, for example, a lens, a spatial low-pass filter, a polarization hologram, or the like, and can be applied widely in optical devices such as an imaging apparatus in which a usual diffraction grating pattern is used.

According to the configuration of the imaging apparatus of the present invention, it is possible to provide an imaging apparatus incorporating a diffractive optical element excellent in moldability, particularly an imaging apparatus incorporating a diffractive optical element having decreased wavelength dependence of the diffraction efficiency. This imaging apparatus is, for example, an imaging apparatus capable of imaging at a wide angle of view, an imaging apparatus having high resolution, or the like, and can be thinned and downsized. Therefore, the imaging apparatus can be applied in a camera mounted on a mobile telephone or a vehicle, a camera for monitoring use, or a camera for medical use.

According to the method for manufacturing a diffractive optical element of the present invention, a diffractive optical element having excellent moldability can be provided.

The invention claimed is:
1. A diffractive optical element comprising:
   a substrate made of a first resin, the substrate having a surface formed into a diffraction grating pattern; and
   a coating film made of a composite material comprising a second resin and inorganic particles, the coating film being disposed in contact with the diffraction grating pattern portion of the surface,
   wherein
   the first resin is at least one selected from a polycarbonate-based resin, a polystyrene-based resin, and a fluorene-based polyester resin,
   a refractive index of the composite material determined by Formula 3 below is greater than a refractive index of the first resin,
   an Abbe's number of the composite material determined by calculating refractive indices with respect to a d-line wavelength (587.6 nm), a F-line wavelength (486.1 nm), and a C-line wavelength (656.3 nm) by using Formula 3 below is greater than an Abbe's number of the first resin,
   the diffraction grating pattern has a groove depth of not more than 20 μm, and a first-order diffraction efficiency of not less than 80% in a wavelength of 400 nm to 700 nm:

$$n_{av}^2 = \frac{n_m^2 \{n_p^2 + 2n_m + 2p(n_p^2 - n_m^2)\}}{n_p^2 + 2n_m - p(n_p^2 - n_m^2)} \quad \text{[Formula 3]}$$

where $n_{av}$ represents the refractive index of the composite material, $n_p$ represents a refractive index of the inorganic particles, $n_m$ represents a refractive index of the second resin, and p represents a content by volume of the inorganic particles in the composite material.

2. The diffractive optical element according to claim 1, wherein at least one selected from the first resin and the composite material absorbs light having a wavelength in an infrared radiation range.

3. The diffractive optical element according to claim 1, wherein at least one selected from the first resin and the composite material absorbs light having a wavelength in an ultraviolet radiation range.

4. The diffractive optical element according to claim 1, wherein an average particle diameter of the inorganic particles is in a range of not less than 1 nm and not more than 100 nm.

5. The diffractive optical element according to claim 1, further comprising the step of forming an antireflection film on the coating film.

6. The diffractive optical element according to claim 5, wherein the antireflection film is made of a material having a refractive index lower than that of the composite material.

7. The diffractive optical element according to claim 5, wherein the antireflection film comprises a resin and inorganic particles.

8. The diffractive optical element according to claim 7, wherein the inorganic particles in the antireflection film are made of silicon oxide.

9. The diffractive optical element according to claim 7, wherein an average particle diameter of the inorganic particles in the antireflection film is in a range of not less than 1 nm and not more than 100 nm.

10. The diffractive optical element according to claim 1, wherein a difference between the refractive index of the first resin and that of the composite material with respect to the d-line wavelength (587.6 nm) is not less than 0.03 and not more than 0.13, and a difference between the Abbe's number of the first resin and that of the composite material is not less than 8.

11. The diffractive optical element according to claim 1, wherein the inorganic particles are made of at least one selected from zirconium oxide, aluminum oxide, and yttrium oxide.

12. An imaging apparatus comprising:
an optical system;
an imaging element for receiving light from a subject, the light having passed through the optical system; and
an arithmetic circuit for generating a subject image based on information detected by the imaging element,
wherein the optical system includes the diffractive optical element according to claim 1.

13. A method for manufacturing a diffractive optical element, the diffractive optical element including:
a substrate made of a first resin, the substrate having a surface formed into a diffraction grating pattern; and
a coating film made of a composite material comprising a second a resin and inorganic particles, the coating film being disposed in contact with the diffraction grating pattern portion of the surface,
the method comprising the steps of:
forming the substrate having the surface formed in the diffraction grating pattern; and
forming the coating film so that the coating film covers the diffraction grating pattern,
wherein
a refractive index of the composite material is greater than a refractive index of the first resin, and
an Abbe's number of the composite material is greater than an Abbe's number of the first resin.

14. The method for manufacturing a diffractive optical element according to claim 13, wherein the step for forming the coating film includes a substep of placing a material comprising a resin in a non-cured state so that the material covers the diffraction grating pattern in an atmosphere under a reduced pressure, and then increasing the pressure of the atmosphere so that the diffraction grating pattern and the material are brought into close contact, while curing the resin.

15. The method for manufacturing a diffractive optical element according to claim 13, wherein
in the step of forming the substrate, the surface is formed by using a die having a copy of the diffraction grating pattern.

16. The method for manufacturing a diffractive optical element according to claim 13, wherein
the refractive index of the composite material is determined by using Formula 3 below, and
the Abbe's number of the composite material is determined by calculating refractive indices with respect to a d-line wavelength (587.6 nm), a F-line wavelength (486.1 nm), and a C-line wavelength (656.3 nm) by using Formula 3 below;

$$n_{av}^2 = \frac{n_m^2\{n_p^2 + 2n_m + 2p(n_p^2 - n_m^2)\}}{n_p^2 + 2n_m - p(n_p^2 - n_m^2)} \quad \text{[Formula 3]}$$

where $n_{av}$ represents the refractive index of the composite material, $n_p$ represents a refractive index of the inorganic particles, $n_m$ represents a refractive index of the second resin, and p represents a content by volume of the inorganic particles in the composite material.

17. A diffractive optical element comprising:
a substrate made of a first resin, the substrate having a surface formed into a diffraction grating pattern; and
a coating film made of a composite material comprising a second resin and inorganic particles, the coating film being disposed in contact with the diffraction grating pattern portion of the surface,
wherein
the first resin is at least one selected from a polycarbonate-based resin, a polystyrene-based resin, and a fluorene-based polyester resin,
the second resin is a cycloolefin-based resin,
the inorganic particles are made of at least one selected from zirconium oxide, aluminum oxide, and yttrium oxide, and
the diffraction grating pattern has a groove depth of not more than 20 μm, and a first-order diffraction efficiency of not less than 80% in a wavelength band of 400 nm to 700 nm.

18. A diffractive optical element comprising:
a substrate made of a first resin, the substrate having a surface formed into a diffraction grating pattern; and;
a coating film made of a composite material comprising a second resin and inorganic particles, the coating film being disposed in contact with the diffraction grating pattern portion of the surface, wherein
a refractive index of the composite material is greater than a refractive index of the first resin,
an Abbe's number of the composite material is greater than an Abbe's number of the first resin, and
the diffraction grating pattern has a groove depth of not more than 20 μm, and a first-order diffraction efficiency of not less than 80% in a wavelength band of 400 nm to 700 nm.

19. The diffractive optical element according to claim 18, wherein the first resin is at least one selected from a polycarbonate-based resin, a polystyrene-based resin, and a fluorene-based polyester resin.

* * * * *